United States Patent
Hoshikawa et al.

(10) Patent No.: US 10,829,128 B2
(45) Date of Patent: Nov. 10, 2020

(54) DRIVING SUPPORT DEVICE

(71) Applicant: TOYOTA JIDOSHA KABUSHIKI KAISHA, Toyota (JP)

(72) Inventors: Yuma Hoshikawa, Nagoya (JP); Wataru Ike, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 16/139,753

(22) Filed: Sep. 24, 2018

(65) Prior Publication Data
US 2019/0092343 A1    Mar. 28, 2019

(30) Foreign Application Priority Data

Sep. 25, 2017    (JP) ................................ 2017-183117

(51) Int. Cl.
*B60W 50/12* (2012.01)
*B60W 30/095* (2012.01)
(Continued)

(52) U.S. Cl.
CPC ............ *B60W 50/12* (2013.01); *B60W 30/08* (2013.01); *B60W 30/09* (2013.01);
(Continued)

(58) Field of Classification Search
CPC ...... B60W 50/12; B60W 30/08; B60W 30/09; B60W 30/0956; B60W 50/0097; B60W 50/10; B60W 2556/50; B60W 2554/00; B60W 2754/10; B60W 10/04; B60W 30/18163; B60W 40/04; B60W 40/09; B60W 40/105; B60W 2050/0071; B60W 2050/0073; B60W 2420/42;
(Continued)

(56) References Cited

U.S. PATENT DOCUMENTS

2007/0032914 A1 *    2/2007    Kondoh ................ B60W 50/16
                                                                              701/1
2010/0134263 A1      6/2010    Mathony et al.
(Continued)

FOREIGN PATENT DOCUMENTS

DE    102010062350 A1    6/2012
EP        2927082 A1    10/2015
(Continued)

*Primary Examiner* — Sze-Hon Kong
(74) *Attorney, Agent, or Firm* — Hunton Andrews Kurth LLP

(57) ABSTRACT

A pre-collision control ECU performs a pre-collision control in order to preventing a collision between the own vehicle and the object when a control start condition is satisfied. The ECU acquires a velocity threshold Vsth corresponding to a region in which the own vehicle travels based on information to specify the region. When an allowance condition has been satisfied before a timing at which the control start condition is satisfied, the ECU performs the pre-collision control. When the allowance condition has not been satisfied before the timing, the ECU does not perform the pre-collision control. The allowance condition is a condition that an accelerator operation amount is equal to or greater than an operation amount threshold and a vehicle velocity is equal to or lower than the acquired velocity threshold.

7 Claims, 8 Drawing Sheets

(51) Int. Cl.
*B60W 50/00* (2006.01)
*B60W 50/10* (2012.01)
*B60W 30/09* (2012.01)
*B60W 30/08* (2012.01)
G05D 1/02 (2020.01)
B60W 10/04 (2006.01)
B60W 30/18 (2012.01)
B60W 40/04 (2006.01)
B60W 40/09 (2012.01)
B60W 40/105 (2012.01)

(52) U.S. Cl.
CPC .... *B60W 30/0956* (2013.01); *B60W 50/0097* (2013.01); *B60W 50/10* (2013.01); B60W 10/04 (2013.01); B60W 30/18163 (2013.01); B60W 40/04 (2013.01); B60W 40/09 (2013.01); B60W 40/105 (2013.01); B60W 2050/0071 (2013.01); B60W 2050/0073 (2013.01); B60W 2420/42 (2013.01); B60W 2420/52 (2013.01); B60W 2520/10 (2013.01); B60W 2540/10 (2013.01); B60W 2540/103 (2013.01); B60W 2554/00 (2020.02); B60W 2556/50 (2020.02); B60W 2720/106 (2013.01); B60W 2754/10 (2020.02); G05D 1/0238 (2013.01)

(58) Field of Classification Search
CPC ......... B60W 2420/52; B60W 2520/10; B60W 2540/10; B60W 2540/103; B60W 2720/106; G05D 1/0238
See application file for complete search history.

(56) References Cited

U.S. PATENT DOCUMENTS

| | | | |
|---|---|---|---|
| 2011/0010034 A1* | 1/2011 | Zagorski | B60W 50/12 701/31.4 |
| 2011/0313665 A1* | 12/2011 | Lueke | G01S 13/931 701/301 |
| 2012/0191313 A1 | 7/2012 | Miyahara | |
| 2014/0025267 A1* | 1/2014 | Tezuka | B60W 30/18027 701/51 |
| 2016/0096514 A1* | 4/2016 | Miller | B60T 7/042 701/70 |

FOREIGN PATENT DOCUMENTS

| | | |
|---|---|---|
| JP | H11-278092 A | 10/1999 |
| JP | 2012-121534 A | 6/2012 |
| JP | 2013-129228 A | 7/2013 |

* cited by examiner

| | DESTINATION A | DESTINATION B | DESTINATION C | DESTINATION D | ... |
|---|---|---|---|---|---|
| VELOCITY THRESHOLD (Vsth [km/h]) | 20 | 15 | 10 | 0 | ... |

FIRST DEVICE

14

DRIVING SUPPORT DEVICE

CROSS-REFERENCE TO RELATED APPLICATION

The present application claims priority to Japanese Patent Application No. 2017-183117 filed on Sep. 25, 2017, which is incorporated herein by reference in its entirety.

BACKGROUND

Technical Field

The present disclosure relates to a driving support device for performing a pre-collision control in order to prevent a collision between an own vehicle and an object when a control start condition is satisfied, the control start condition being a condition satisfied when a collision index value correlating with a probability of the collision and an index value threshold satisfy a predetermined relationship.

Related Art

Hereinto, as proposed in Japanese Patent Application Laid-open No. 2012-121534, there has been known a device (hereinafter, referred to as a "conventional device") configured to perform a pre-collision control (for example, alert, automatic brake, and the like) of a vehicle when an obstacle with a high probability of colliding with the vehicle is detected.

The conventional device determines that an operation performed on an accelerator by the driver is a wrong operation so as to perform a pre-collision control, when an operation amount of the accelerator is greater than a threshold Sa and an operation speed is higher than a threshold Va.

SUMMARY

In general, a driver tends to press/step the accelerator pedal greatly and quickly, when the driver intends/wishes to overtake a preceding vehicle. When the driver presses the accelerator pedal intentionally (when the driver performs an intentional operation on the accelerator pedal) in order to make the vehicle overtake the preceding vehicle, the conventional device is likely to determines, by mistake, that the operation performed on the accelerator pedal is the wrong operation so as to perform the pre-collision control. Accordingly, the conventional device may perform an unnecessary pre-collision control when the driver performs the intentional operation on the accelerator pedal. This unnecessary pre-collision control may sometimes annoy the driver.

In the above described context, the following device is considered. This device allows itself to perform the pre-collision control at a timing at which a collision probability becomes high if an allowance condition has been satisfied before that timing. The allowance condition is satisfied when the operation amount of the accelerator pedal is equal to or greater than an operation amount threshold and a vehicle velocity is equal to or lower than a velocity threshold. On the other hand, if the allowance condition has been not satisfied before this timing, this device prohibits itself from performing the pre-collision control.

Meanwhile, it has been known that driving characteristics of the driver differ from region (a country, a prefecture, and the like) to region. However, the velocity threshold are set at the same value for all regions in the above described device. There is a region in which drivers tend to press the accelerator pedal greatly in order to make the vehicle overtake the preceding vehicle when the vehicle velocity is low. Hereinafter, such a region is referred to as a "low velocity overtaking region". In the low velocity overtaking region, even though the operation on the accelerator pedal is the intentional operation to make the vehicle overtake the preceding vehicle, the "possibility that the above described device determines that the allowance condition is satisfied so as to perform the unnecessary pre-collision control" becomes higher as compared with the other regions. On the other hand, there is a region in which the drivers tend to perform the wrong operation on the accelerator when the vehicle velocity is high. Hereinafter, such a region is referred to as a "high velocity wrong operation region". In the high velocity wrong operation region, even though the operation on the accelerator pedal is the wrong operation, the "possibility that the above described device determines that the allowance condition is not satisfied so as not to perform the pre-collision control" becomes higher as compared with the other regions.

The present disclosure has been made in order to solve the above described problem. The present disclosure has an object to provide a driving support device that can reduce/decrease the possibility that the unnecessary pre-collision control is performed and that can perform the pre-collision control certainly when the driver performs the wrong operation, through setting the velocity threshold of the allowance condition for the pre-collision control to an appropriate value in consideration of the characteristics of the region.

The driving support device (hereinafter, referred to as the present embodiment) according to the present disclosure comprises:

an object detecting unit (20, 10, Step 604) for detecting an object which is present around an own vehicle;

an accelerator operation amount detecting unit (21, 10, Step 505, Step 602) for acquiring an operation amount (AP) of an accelerator on which a driver performs an operation for accelerating the own vehicle;

a velocity detecting unit (23, 10, Step 510, Step 606) for detecting a vehicle velocity (Vs) which is a velocity of the own vehicle; and a pre-collision control performing unit (10, 30, 31, 32, 34, 36, 38, Step 628, Step 636, Step 910, Step 930, Step 950) for performing a pre-collision control to prevent a collision between the own vehicle and the object when a control start condition is satisfied ("Yes" at Step 624, "Yes" at Step 626, "No" at Step 626, "Yes" at Step 630, "No" at Step 630, "Yes" at Step 905, "Yes" at Step 915, "Yes" at Step 925, "Yes" at Step 935, "Yes" at Step 945, "Yes" at Step 960), the control start condition being a condition satisfied when a collision index value correlating with a probability of the collision between the own vehicle and the object and an index value threshold satisfy a predetermined relationship.

The pre-collision control performing unit is configured to:
the pre-collision control performing unit configured to:
acquire a velocity threshold (Vsth) corresponding to a region in which the own vehicle travels, based on information (destination information 25 and a present location) to specify the region (Step 530, Step 805); and start to perform the pre-collision control ("Yes" at Step 622, Step 628, Step 632, Step 636, "Yes" at Step 905, Step 910, "Yes" at Step 925, Step 930, "Yes" at Step 945, Step 950) if an allowance condition has been satisfied before a timing at which the control start condition becomes satisfied ("Yes" at Step 520, "Yes" at Step 535, "Yes" at Step 815, "Yes" at Step 840, "Yes" at Step 865), the allowance condition being a condition that the accelerator operation amount is equal to or greater than an operation amount threshold (AP1th) and the vehicle velocity is equal to or lower than the acquired velocity threshold; and the pre-collision control performing unit configured not to:

perform the pre-collision control if the allowance condition has not been satisfied before the timing at which the control start condition becomes satisfied ("No" at Step 622, "No" at Step 905, "No" at Step 925, "No" at Step 945).

According to the present embodiment, the vehicle velocity threshold is acquired based on the information for identifying the region in which the own vehicle is traveling, and it is determined whether or not the allowance condition that the accelerator operation amount is equal to or greater than the operation amount threshold and the vehicle velocity is equal to lower than the acquire velocity threshold. If the allowance condition has been satisfied before the time point at which the control start condition becomes satisfied, the pre-collision control is performed. This is because it is considered (or is highly likely) that the "cause the accelerator operation amount to become equal to or greater than the operation amount threshold" is the driver's wrong operation which is an accelerator operation for accelerating the own vehicle in spite of the driver's indention to decelerate the own vehicle". On the other hand, if the allowance condition has not been satisfied before the time point at which the control condition becomes satisfied, the pre-collision control is not performed. This is because it is considered in this case that "a possibility that the accelerator operation amount becomes equal to or greater than the operation amount threshold owing to the driver's intentional operation for making the own vehicle overtake a preceding vehicle" is high.

The present embodiment allows the velocity threshold to have been set to a value determined in advance in consideration of the driver characteristics in the region in which the own vehicle is traveling. Thus, it can be determined whether or not the "allowance condition corresponding to the characteristics in the region in which the own vehicle is traveling" is satisfied. If the velocity threshold corresponding to the "low velocity overtaking region" has been set to a relatively low value, the present embodiment can reduce/decrease a possibility that it is erroneously determined that the wrong operation is performed (i.e., the possibility that it is erroneously determined that the allowance condition is satisfied), when the own vehicle is made to overtake the preceding vehicle while the vehicle velocity is relatively low in such a low velocity overtaking region. Thus, the present embodiment can reduce/decrease a possibility that an unnecessary pre-collision control is performed in the low velocity overtaking region. On the other hand, if the velocity threshold corresponding to the "high velocity wrong operation region" has been set to a relatively high value, the present embodiment can increase a possibility that it can be correctly determined that the wrong operation is performed (i.e., a possibility that it is certainly determined that the allowance condition is satisfied), when the wrong operation is performed while the vehicle velocity is relatively high in such a high velocity wrong operation region.

Accordingly, the present embodiment can reduce/decrease the possibility that the unnecessary pre-collision control is performed, and can increase the possibility that the pre-collision control is performed when the wrong operation is performed.

According to one embodiment of the present disclosure, The driving support device further comprises a relationship memory unit (12) in which velocity threshold information (14 and 17) defining a relationship between each of a plurality of regions and the corresponding one velocity threshold has been stored in advance, wherein the pre-collision control performing unit is configured to acquire the velocity threshold corresponding to the region in which the own vehicle travels, based on the velocity threshold information (Step 530, Step 805).

The velocity threshold corresponding to the region in which the own vehicle is traveling is acquired from the velocity threshold information which can define the velocity threshold in consideration of the (driver) characteristics in each of a plurality of regions. Therefore, this embodiment can determine whether or not the allowance condition is satisfied using the velocity threshold having a value in consideration of (or corresponding to, or reflecting) the characteristics in the region in which the own vehicle is traveling. Accordingly, the device can reduce/decrease the possibility that the unnecessary pre-collision control is performed, and can increase the possibility that the pre-collision control is performed when the wrong operation is performed.

According to one embodiment of the present disclosure, the velocity threshold information (70), which has been stored in the relationship memory unit in advance, defines a relationship between each of the plurality of regions and the corresponding one first velocity threshold serving as the velocity threshold and a relationship between each of a plurality of regions and the corresponding one second velocity threshold serving as the velocity threshold, the pre-collision control performing unit is configured to:

acquire the first velocity threshold and the second velocity threshold, each corresponding to the region in which the own vehicle travels, based on the velocity threshold information (Step 805); and start to perform a first pre-collision control serving as the pre-collision control (Step 910, Step 930, Step 945) at a first timing at which a first control start condition serving as the control start condition becomes satisfied if a first allowance condition serving as the allowance condition has been satisfied before the first timing ("Yes" at Step 905, "Yes" at Step 925, "Yes" at Step 945), the first control start condition being a condition that the collision index value and a first index value threshold serving as the index value threshold satisfy a first predetermined relationship serving as the predetermined relationship, and the first allowance condition being a condition that the accelerator operation amount is equal to or greater than the operation amount threshold and the vehicle velocity is equal to or lower than the acquired first velocity threshold ("Yes" at Step 815, "Yes" at Step 840, "Yes" at Step 865), the pre-collision control performing unit is configured not to:

perform the first pre-collision control if the first allowance condition has not been satisfied before the first timing ("No" at Step 905, "No" at Step 925, "No" at Step 945), the pre-collision control performing unit is configured to:

start to perform a second pre-collision control serving as the pre-collision control (Step 910, Step 930, Step 945) at a second timing at which a second control start condition serving as the control start condition becomes satisfied if a second allowance condition serving as the allowance condition has been satisfied before the second timing ("Yes" at Step 905, "Yes" at Step 925, "Yes" at Step 945), the second control start condition being a condition that the collision index value and a second index value threshold serving as the index value threshold satisfy a second predetermined relationship serving as the predetermined relationship, and the second allowance condition being a condition that the accelerator operation amount is equal to or greater than the operation amount threshold and the vehicle velocity is equal to or lower than the acquired second velocity threshold ("Yes" at Step 815, "Yes" at Step 840, "Yes" at Step 865), and the pre-collision control performing unit is configured not to:

perform the second pre-collision control if the second allowance condition has not been satisfied before the second timing ("No" at Step 905, "No" at Step 925, "No" at Step 945).

This embodiment can use the "velocity threshold for each of the first pre-collision control and the second pre-collision control" that corresponds to each of a plurality of the regions. The first velocity threshold for a region where there are many drivers who do not want the first pre-collision control to be performed has been set to a smaller value. This allows the first allowance condition to be harder to be satisfied. The second velocity threshold for a region where there are many drives who do not want the second pre-collision control to be performed has been set to a smaller value. This allows the second allowance condition to be harder to be satisfied.

According to one embodiment of the present disclosure, the driving support device further comprises a destination information memory unit (a body ECU 24) in which information (destination information 25) for identifying a destination which is a region in which the own vehicle is to be sold has been stored, wherein, information which defines a relationship between each of the plurality of the destinations and the corresponding one velocity threshold has been stored as the velocity threshold information (14 and 70) in the relationship memory unit in advance, and the pre-collision control performing unit is configured to apply the destination which has been stored in the destination memory unit to the relationship memory unit so as to acquire the velocity threshold (Step 530, Step 805).

This embodiment acquires the velocity threshold corresponding to the destination indicating a region where the own vehicle is to be sold. Therefore, the velocity threshold can be acquired based on the destination which more accurately indicates the region in which the own vehicle travels. It is determined whether or not the allowance condition is satisfied using the velocity threshold corresponding to the destination. Accordingly, it can be determined whether or not the allowance condition is satisfied using the vehicle velocity which accurately reflects the characteristics of the region in which the own vehicle travels, so that this embodiment can further reduce/decrease the possibility that the unnecessary pre-collision control is performed, and can further increase the possibility that the pre-collision control is performed when the wrong operation is performed.

According to one embodiment of the present disclosure, the driving support device further comprises a location acquiring unit (26) for acquiring a present location of the own vehicle, wherein the pre-collision control performing unit is configured to:

acquire the present location of the own vehicle from the location acquiring unit (Step 525 in a modification example); and apply the acquired present location to the relationship memory unit so as to acquire the velocity threshold (Step 530 in the modification example).

This embodiment acquires the present location of the own vehicle, and the velocity threshold corresponding to the acquired present location. Thus, the velocity threshold can be acquired based on the present location of the own vehicle which more accurately represents the region in which the own vehicle travels. It is determined whether or not the allowance condition is satisfied using the velocity threshold corresponding to the present location of the own vehicle. Accordingly, it can be determined whether or not the allowance condition is satisfied using the vehicle velocity which accurately reflects the characteristics in the region in which the own vehicle is traveling, so that the present device can further reduce/decrease the possibility that the unnecessary pre-collision control is performed, and can further increase the possibility that the pre-collision control is performed when the wrong operation is performed.

The present disclosure can be expressed as follows.

The present disclosure comprises the object detecting unit, the accelerator operation amount detecting unit, the velocity detecting unit, and the pre-collision control performing unit.

The present device further comprises a performing propriety information memory unit (12) in which performing propriety information (14, 70) indicative of whether or not the pre-collision control is allowed to be performed in each of a plurality of regions has been stored in advance.

The pre-collision control performing unit is configured to:

acquire the performing propriety information corresponding to a region in which the own vehicle travels from the performing propriety information memory unit (Step 530, Step 805); and start to perform the pre-collision control if an allowance condition has been satisfied before a timing at which the control start condition becomes satisfied ("Yes" at Step 622, Step 628, Step 632, Step 636, "Yes" at Step 905, Step 910, "Yes" at Step 925, Step 930, "Yes" at Step 945, Step 950), in a case where the performing propriety information indicates that the pre-collision control is allowed to be performed (Vsth>0), the allowance condition being a condition that the accelerator operation amount is equal to or greater than an operation amount threshold and the vehicle velocity is equal to or lower than a velocity threshold ("Yes" at Step 520 and "Yes" at Step 535, "Yes" at Step 815, "Yes" at Step 840, "Yes" at Step 865); and the pre-collision control performing unit configured not to:

perform the pre-collision control when the allowance condition has not been satisfied before the timing at which the control start condition becomes satisfied ("No" at Step 622, "No" at Step 905, "No" at Step 925, "No" at Step 945); and the pre-collision control performing unit configured not to:

perform the pre-collision control regardless of whether or not the allowance condition has been satisfied, in a case where the performing propriety information indicates that the pre-collision control is not allowed to be performed ("No" at Step 622, "No" at Step 905, "No" at Step 925, "No" at Step 945).

The performing propriety information for the region where there are many drivers who do not want the pre-collision control to be performed can be set in such a manner that the performing propriety information represents/indicates that the pre-collision control is not allowed to be performed. The performing propriety information for the region where there are many drivers who want the pre-collision control to be performed can be set in such a manner that the performing propriety information represents/indicates that the pre-collision control is allowed to be performed. Therefore, the performing propriety information can be information corresponding to the characteristics in the region in which the own vehicle travels. Accordingly, the embodiment can reduce/decrease the possibility that the unnecessary pre-collision control is performed, and can improve/increase the possibility that the pre-collision control is performed when the wrong operation is performed, based on the performing propriety information which reflects the characteristics if the region in which the own vehicle is traveling.

One embodiment of the present disclosure can also be expressed as follows.

The embodiment comprises the object detecting unit, the accelerator operation amount detecting unit, the velocity detecting unit, and the pre-collision control performing unit.

The pre-collision control performing unit is configured to:

start to perform a first pre-collision control serving as the pre-collision control (Step 910, Step 930, Step 945) at a first timing at which a first control start condition serving as the control start condition becomes satisfied, if a first allowance condition has been satisfied before the first timing ("Yes" at Step 905, "Yes" at Step 925, "Yes" at Step 945), the first control start condition being a condition that the collision index value and a first index value threshold serving as the index value threshold satisfy a first predetermined relationship serving as the predetermined relationship; and the first allowance condition being a condition that the accelerator operation amount is equal to or greater than an operation amount threshold and the vehicle velocity is equal to or lower than a first velocity threshold ("Yes" at Step 815, "Yes" at Step 840, "Yes" at Step 865), the pre-collision control performing unit configured not to:

perform the first pre-collision control if the first allowance condition has not been satisfied before the first timing ("No" at Step 905, "No" at Step 925, "No" at Step 945);

the pre-collision control performing unit configured to:

start to perform a second pre-collision control serving as the pre-collision control (Step 910, Step 930, Step 945) at a second timing at which a second control start condition serving as the control start condition becomes satisfied if a second allowance condition has been satisfied before the second timing ("Yes" at Step 905, "Yes" at Step 925, "Yes" at Step 945), the second control start condition being a condition that the collision index value and a second index value threshold serving as the index value threshold satisfy a second predetermined relationship serving as the predetermined relationship; and the second allowance condition being a condition that the accelerator operation amount is equal to or greater than the operation amount threshold and the vehicle velocity is equal to or lower than a second velocity threshold ("Yes" at Step 815, "Yes" at Step 840, "Yes" at Step 865), and the pre-collision control performing unit configured not to:

perform the second pre-collision control if the second allowance condition has not been satisfied before the second timing ("No" at Step 905, "No" at Step 925, "No" at Step 945).

The embodiment above allows the first velocity threshold corresponding to the first pre-collision control and the second velocity threshold corresponding to the second pre-collision control to be independent from each other. Therefore, difficulty for the first allowance condition corresponding to the first pre-collision control to be satisfied can be set independently form difficulty for the second allowance condition corresponding to the second pre-collision control to be satisfied. For example, when the first pre-collision control includes an advanced pre-collision brake control, and the second pre-collision control includes a final pre-collision brake control, the first velocity threshold can be set to a value smaller than the second velocity threshold. In this case, the first allowance condition is harder to be satisfied than the second allowance condition. This can reduce/decrease the possibility that the first pre-collision control (the advanced pre-collision brake control) is performed erroneously while the own vehicle is overtaking the preceding vehicle. Furthermore, this can prevent "the possibility that the second pre-collision control (the final pre-collision brake control) is performed when the wrong operation is performed" from being reduced/decreased.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAILED DESCRIPTION

A driving support device according to each embodiment of the present disclosure will next be described with reference to the accompanying drawings. A vehicle in which the driving support device is installed is referred to as an "own vehicle SV", when this vehicle needs to be distinguished from other vehicles.

First Embodiment

When a collision index value correlates with a "collision probability of a collision between an object detected by a millimeter wave radar 20 shown in FIG. 1 and the own vehicle SV" satisfies a predetermined control start condition, a driving support device (hereinafter, referred to as a "first device") according to a first embodiment of the present disclosure performs one of pre-collision controls. The pre-collision controls performed by the first device include an alert control, an advanced pre-collision brake control, and a final pre-collision brake control. The first device performs the alert control at the earliest timing, the advanced pre-collision brake control at the next earliest timing, and the final pre-collision brake control at the latest timing.

The first device informs "a driver of the own vehicle SV" of presence of an object with a high probability of a collision with the own vehicle SV, using a display unit 30 (refer to FIG. 1) and a speaker 31 (refer to FIG. 1) through the alert control. That is, the first device alerts the driver of a high probability of the collision.

The first device decrease a vehicle velocity/speed Vs of the own vehicle SV through braking "in order to prevent the collision between the own vehicle SV and the object and/or decrease the velocity at a collision timing" through the advanced pre-collision brake control and through the final pre-collision brake control. The final pre-collision brake control is different from the advanced pre-collision brake control in the following point. Through the final pre-collision brake control, the first device continues braking until the vehicle velocity Vs becomes "0", and maintains the vehicle velocity Vs at "0" during a predetermined time period after the vehicle velocity becomes "0".

Figure 1:
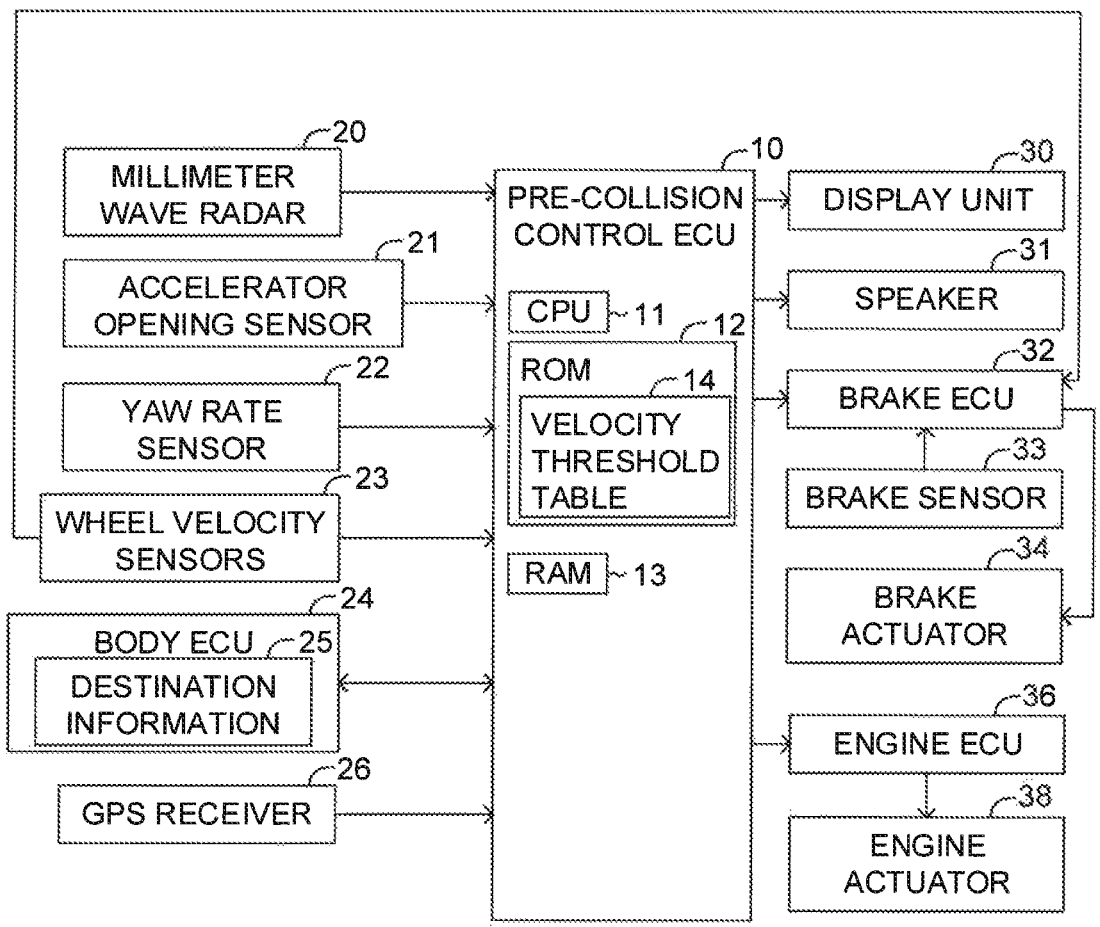
FIG. 1 is a schematic system configuration diagram of a driving support device (a first device) according to a first embodiment of the present disclosure.

As shown in FIG. 1, the first device comprises a pre-collision control ECU 10. The pre-collision control ECU 10 comprises a microcomputer including a CPU 11, a ROM 12, a RAM 13, and the like. A velocity threshold table 14 (refer to FIG. 3) described below has been stored in the ROM 12. It should be noted that an ECU is an abbreviation of an "Electronic Control Unit" which includes a microcomputer as a main part in this specification. The microcomputer includes a CPU and memories (for example, a ROM, a RAM, and the like). The CPU achieves various functions by executing instructions (program, routine) stored in the ROM.

The first device further comprises a millimeter wave radar 20, an accelerator opening sensor 21, a yaw rate sensor 22, wheel velocity sensors 23, a body ECU 24, GPS (Global Positioning System) receiver 26, the display unit 30, the speaker 31, a brake ECU 32, a brake sensor 33, a brake actuator 34, an engine ECU 36, and an engine actuator 38. The pre-collision ECU 10 is connected to the millimeter wave radar 20, the accelerator opening sensor 21, the yaw rate sensor 22, the wheel velocity sensors 23, the GPS receiver 26, the display unit 30, and the speaker 31. The pre-collision control ECU 10, the body ECU 24, the brake ECU 32, and the engine ECU 36 are connected to each other via a CAN (Controller Area Network) to be able to transmit and receive information to/from each other.

Figures 2, 3:
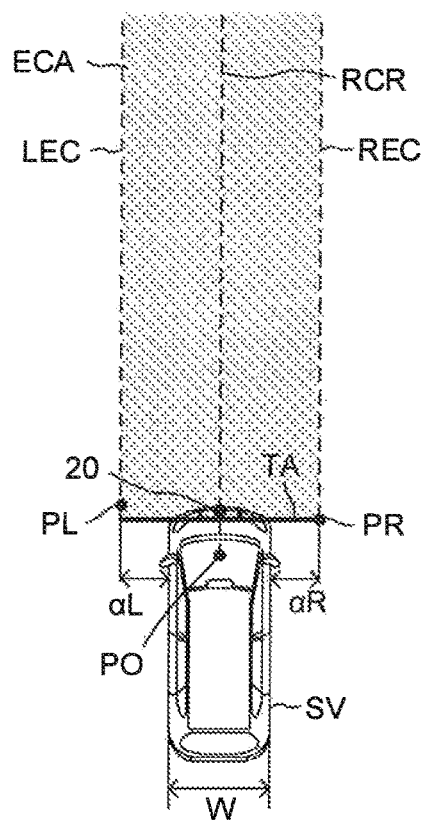
FIG. 2 is an explanatory diagram illustrating a location in which a millimeter wave radar is arranged and a predicted traveling path.
FIG. 3 is an explanatory diagram illustrating a velocity threshold table shown in FIG. 1.

As shown in FIG. 2, the millimeter wave radar 20 is arranged at a center location of a front end of the own vehicle SV in a vehicle width direction. The millimeter wave radar 20 detects an object location and an object relative velocity in relation to the own vehicle SV using radio waves (hereinafter, referred to as "millimeter waves") in a millimeter band. More specifically, the millimeter wave radar 20 emits (transmits) the millimeter waves, and receives the millimeter waves (reflected waves) which are reflected by the object (three dimensions object) which is present in an emission area of the millimeter waves. Thereafter, the millimeter wave radar 20 calculates a distance (object distance) between the own vehicle SV and the object based on a time period between a time point at which the millimeter waves are transmitted and a time point at which the millimeter waves are received, and calculates an object direction in relation to the own vehicle SV based on a direction of the received reflected waves. An object location in relation to the own vehicle SV is specified by the object distance and the object direction.

The millimeter wave radar 20 calculates the object relative velocity in relation to the own vehicle SV based on a frequency change (the Doppler effect) of the reflected waves. The millimeter wave radar 20 transmits object information including the object location and the object relative velocity to the pre-collision control ECU 10, every time a predetermined time period elapses.

Referring to FIG. 1 again, the accelerator opening sensor 21 detects an operation amount (an accelerator pedal pressing/stepping amount) of an accelerator (an accelerator pedal) on which a driver performs an operation for accelerating the own vehicle SV. The accelerator opening sensor 21 generates a signal indicative of an accelerator operation amount AP. The pre-collision control ECU 10 acquires (detects) the accelerator operation amount AP from the accelerator opening sensor 21, every time a predetermined time period elapses.

The yaw rate sensor 22 detects a yaw rate Yr generated in the own vehicle SV, and generates a signal indicative of the yaw rate Yr. The pre-collision control ECU 10 acquires (detects) the yaw rate Yr from the yaw rate sensor 22, every time a predetermined time period elapses.

Each of the wheel velocity sensors 23 is provided in the corresponding one of the wheels. Each of the wheel velocity sensors 23 generates one pulse signal (one wheel pulse signal) when the corresponding one of the wheels rotates by a predetermined angle. The pre-collision control ECU 10 calculates a rotation velocity (a wheel velocity) of each of the wheels, based on the number of the pulse signals transmitted from the corresponding one of the wheel velocity sensors 23 for/within a predetermined time period. The pre-collision control ECU 10 calculates the vehicle velocity Vs indicative of a velocity of the own vehicle SV based on the wheel velocity of each of the wheels. For example, the vehicle velocity Vs is an average value of the wheel velocities of four wheels.

The body ECU 24 controls a state of each door lock apparatus (not shown) of the own vehicle SV, an open-close state of windows (not shown) of the own vehicle SV, and the like. Destination information 25 has been stored in a ROM (not shown) of the body ECU 24. The destination information 25 is an identifier for identifying a region in which the own vehicle SV is sold (shipped). The own vehicle SV travels in the region identified by the destination information 25. For example, the region is a country/state, an area, or the like.

The GPS receiver 26 receives a GPS signal from GPS satellites so as to acquire a present location of the own vehicle SV. The GPS receiver 26 acquires the present location of the own vehicle SV, every time a predetermined time period elapses, and transmits location information on the own vehicle SV indicative of the acquired present location to the pre-collision control ECU 10, every time a predetermined time period elapses. The GPS receiver 26 is used in a modification example described later of this embodiment.

The display unit 30 receives display information from each of the ECUs and a navigation apparatus installed in the own vehicle SV, and displays the display information on a partial area (a display area) of a front glass of the own vehicle SV. That is, the display unit 30 is a head up display (hereinafter, referred to as a "HUD"). An alert screen for causing the driver to pay attention to "a control target obstacle which is the object with a high probability of the collision between the object and the own vehicle SV among the objects detected by the millimeter wave radar 20". When the display unit 30 receives, from the pre-collision control ECU 10, display instruction information which instructs the display unit 30 to display the alert screen, the display unit 30 displays the alert screen. In some embodiments, the display unit 30 is a liquid crystal display.

When the speaker 31 receives, from the pre-collision control ECU 10, output instruction information for instructing the speaker 31 to output/generate alert sound, the speaker 31 outputs/generates the alert sound for causing the driver to pay attention to the obstacle, in response to the received output instruction information.

The brake ECU 32 is connected to the wheel velocity sensors 23 and the brake sensor 33, and receives detection signals from theses sensors. The brake sensor 33 detects parameters which are used when a brake apparatus (not shown) installed in the own vehicle is controlled. The brake sensor 33 includes a sensor for detecting an operation amount (a press/step amount) of a brake pedal, and the like.

The brake ECU 32 is connected to the brake actuator 34. The brake actuator 34 is a Hydraulic control actuator. The brake actuator 34 is provided in a hydraulic circuit between an "unillustrated master cylinder which pressurizes working oil by using a depressing force applied to the brake pedal" and an "unillustrated friction brake apparatus which includes well-known wheel cylinder provided in each of the wheels". The brake actuator 34 adjusts oil pressure applied to each of the wheel cylinders. The brake ECU 32 drives the brake actuator 34 so as to adjust braking force (an acceleration of the own vehicle SV (a negative acceleration, that is a deceleration)) of each of the wheels.

When the brake ECU 32 receives a brake instruction signal form the pre-collision control ECU 10, the brake ECU 32 controls the brake actuator 34 to decrease the vehicle velocity Vs by braking such that the actual acceleration of the own vehicle SV coincides with a target deceleration TG included in the brake instruction signal. The pre-collision control ECU 10 acquires the actual acceleration of the own vehicle SV based on a change amount of the vehicle velocity Vs for/within a predetermined time period.

The engine ECU 36 is connected to the engine actuator 38. The engine actuator 38 is an actuator for changing an operating state of an internal combustion engine (not shown) which is a driving source of the own vehicle SV. The engine actuator 38 includes at least a throttle valve actuator for changing throttle valve opening. The engine ECU 36 drives the engine actuator 38 so as to change torque which the internal combustion engine generates. Therefore, the engine ECU 36 can control driving force of the own vehicle SV. When the pre-collision control ECU 10 transmits the brake instruction signal to the brake ECU 32, the pre-collision control ECU 10 transmits a torque decreasing instruction signal to the engine ECU 36. When the engine ECU 36 receives the torque decreasing instruction signal, the engine ECU 36 drives the engine actuator 38 (in actuality, the engine ECU 36 drives the throttle valve actuator in such a manner the throttle valve opening becomes the minimum opening) so that the torque of the internal combustion engine becomes the minimum torque. If the own vehicle SV is a hybrid vehicle, the engine ECU 36 can control the driving force of the own vehicle SV which is generated by at least one of the internal combustion engine and a motor as the vehicle driving source. If the own vehicle SV is an electronic vehicle, the engine ECU 36 can control the driving force generated by the motor as the vehicle driving source.

(Operation Outline)

An outline of the first device operation will next be described. The first device performs an allowance process and a pre-collision control performing process independently, every time a predetermined time period elapses. The allowance process is a process for determining whether or not "an allowance condition for allowing the first device to perform the pre-collision control" is satisfied. The pre-collision control performing process is a process for determining whether or not the first device actually performs at least one of the pre-collision controls.

First, the allowance process will be described.

The first device acquires the destination information 25 from the body ECU 24, and refers to the velocity threshold table 14 to acquire a velocity threshold Vsth corresponding to the destination identified by the acquired destination information 25. Thereafter, the first device determines whether or not the allowance condition is satisfied. The allowance condition is satisfied when the accelerator operation amount AP is equal to or greater than a first operation amount threshold AP1th and the vehicle velocity Vs is equal to or lower than the velocity threshold Vsth. For example, the first operation amount threshold AP1th has been set to "90%" when the maximum accelerator operation amount is defined as "100%".

The velocity threshold table 14 is described referring to FIG. 3.

The velocity threshold table 14 defines the velocity threshold Vsth for each of a plurality of the destinations. More specifically, the velocity threshold Vsth corresponding to a destination A of the velocity threshold table 14 has been set to "20 km/h". The velocity threshold Vsth corresponding to a destination B of the velocity threshold table 14 has been set to "15 km/h". The velocity threshold Vsth corresponding to a destination C of the velocity threshold table 14 has been set to "10 km/h". The velocity threshold Vsth corresponding to a destination D of the velocity threshold table 14 has been set to "0 km/h".

The pre-collision control performing process will be next described.

The first device extracts, as the obstacle, the object with the probability that the object collides with the own vehicle SV among the objects detected by the millimeter wave radar 20. Thereafter, the first device calculates a predicted collision time period TTC (time to collision) for each of the obstacles. The predicted collision time period TTC represents a rime period which it takes for each of the obstacles to collide with the own vehicle SV.

In a case where the accelerator operation amount AP is equal to or smaller than a control threshold APcth, the first device performs one of the pre-collision controls when the predicted collision time period TTC becomes equal to or shorter than a time thresholds T(n)th. For example, the control threshold APcth has been set to "90%" when the maximum accelerator operation amount is defined as "100%". On the other hand, the first device does not perform one of the pre-collision controls when the predicted time period TTC is greater than the time thresholds T(n)th.

The time thresholds T(n)th have been set for each of the pre-collision controls including the above described alert control, the above described advanced pre-collision brake control, and the above described final pre-collision brake control. In actuality, the time thresholds T(n)th include a time threshold T1th, a time threshold T2th, and a time threshold T3th. The time threshold T1th is a time threshold for the alert control, the time threshold T2th is a time threshold for the advanced pre-collision brake control, and the time threshold T3th is a time threshold for the final pre-collision brake control. The time threshold T1th has been set at the greatest value among the time thresholds T(n)th, the time threshold T2th has been set at the next/second greatest value among the time thresholds T(n)th, and the time threshold T3th has been set at the smallest value among the time thresholds T(n)th. When the predicted collision time period TTC is equal to or shorter/smaller than the time threshold T1th, the first device performs the alert control. When the predicted collision time period TTC is equal to or shorter/smaller than the time threshold T2th, the first device performs the advanced pre-collision brake control. When the predicted collision time period TTC is equal to or shorter/smaller than the time threshold T3th, the first device performs the final pre-collision brake control.

On the other hand, in a case where the accelerator operation amount AP is equal to or greater than the control threshold APcth, and when the predicted collision time period TTC becomes equal to or shorter/smaller than the time threshold T(n)th, the first device determines whether or not the allowance condition has been satisfied before a time point at which the predicted collision time period TTC becomes equal to or smaller than the time threshold T(n)th. If the allowance condition has been satisfied before the above described time point, the first device performs the respective pre-collision controls. In contrast, if the allowance condition has not been satisfied before the above described time point, the first device does not perform the respective pre-collision controls.

When the accelerator operation amount AP is equal to or greater than the control threshold APcth, the accelerator pedal is pressed/stepped greatly by the driver due to either the driver's intentional operation or the driver's wrong operation. The wrong operation is caused due to the driver's misrecognition of the brake pedal for the accelerator pedal. The wrong operation is likely to be performed when the vehicle velocity is relatively low, because the wrong operation tends to be performed when the own vehicle SV starts to travel/run. When the wrong operation is performed, the own vehicle SV is accelerated rapidly. Therefore, the driver notices the excessive acceleration of the own vehicle SV and is likely to press/step the accelerator pedal instead of the brake pedal again greatly at once in order to brake the vehicle. Thus, in the case where the wrong operation is performed, the accelerator operation amount AP becomes equal to or greater than the operation amount threshold AP1th when the vehicle velocity Vs is relatively low. That is, when the wrong operation is performed, the above described allowance condition (AP≥AP1th and Vs≤Vsth) is likely to be satisfied. On the other hand, when the driver tries to have the own vehicle SV overtake the preceding vehicle, the accelerator operation amount AP becomes equal to or greater than the first operation amount threshold AP1th. However, it is likely that the own vehicle SV overtakes the preceding vehicle when the vehicle velocity Vs of the own vehicle SV is relatively high. Therefore, when the driver tries to have the own vehicle SV overtake the preceding vehicle, the above described allowance condition (AP AP1th and Vs Vsth) is unlikely to be satisfied.

In the above described context, when the accelerator operation amount AP is equal to or greater than the control threshold APcth and the predicted collision time period TTC becomes equal to or shorter/smaller than the time thresholds T(n)th, the first device determines whether or not the allowance condition has been satisfied in order to determine whether the driver presses/steps the accelerator pedal greatly due to the driver's intentional operation or the driver's wrong operation. More specifically, when the allowance condition has not been satisfied before the time point at which the accelerator operation amount AP is equal to or greater than the control threshold APcth and the predicted collision time period TTC becomes equal to or shorter than the time thresholds T(n)th, the first device determines that the driver presses/steps the accelerator pedal due to the driver's intentional operation so as not to perform the respective pre-collision controls. On the other hand, if the allowance condition has been satisfied before the time point at which the accelerator operation amount AP is equal to or greater than the control threshold APcth and the predicted collision time period TTC becomes equal to or shorter than the time thresholds T(n)th, the first device determines that the driver presses/steps the accelerator pedal due to the driver's wrong operation so as to perform the respective pre-collision controls.

According to such an approach, the first device can perform the respective pre-collision controls certainly when the wrong operation is performed, and the first device can prohibit itself from performing the unnecessary pre-collision controls when the wrong operation is not performed so that the first device can avoid the unnecessary pre-collision controls which may annoy the driver.

However, it is turned out that there is the region in which a ratio of "the driver who performs the wrong operation on the accelerator pedal when vehicle velocity Vs is relatively high" is high. Such a region is referred to as the high velocity wrong operation region. If "the velocity threshold Vsth of the first device installed in the vehicle which is to be sold in the high velocity wrong operation region" has been set to the same relatively low value as "the velocity threshold Vsth of the first device installed in the vehicle which is to be sold in the region (the other region) other than the high velocity wrong operation region", the first device may determine that the allowance condition is not satisfied when the wrong operation is performed while the vehicle velocity Vs is relatively high so that the first device may not perform the respective pre-collision controls. From this viewpoint, the velocity threshold Vsth of the first device installed in the vehicle which is to be sold in the high velocity wrong operation region needs to have been set at a value greater than the velocity threshold Vsth of the first device installed in the vehicle which is to be sold in the other region. The velocity threshold Vsth of the first device installed in the vehicle which is to be sold in the high velocity wrong operation region has been set at a relatively great value so that the first device can improve/increase a possibility that the allowance condition is satisfied when the wrong operation is performed while the vehicle velocity Vs is relatively high. As a result, the first device can improve/increase a possibility that the respective pre-collision controls are performed in this case.

On the other hand, it is turned out that there is the region in which a ratio of "the driver who presses/steps the accelerator pedal greatly in order to make the own vehicle SV overtake the preceding vehicle when the vehicle velocity Vs is relatively low" is high. Such a region is referred to as the low velocity overtaking region. If "the velocity threshold Vsth of the first device installed in the vehicle which is to be sold in the low velocity overtaking region" has been set at the same relatively high value as "the velocity threshold Vsth of the first device installed in the vehicle which is to be sold in the region (the other region) other than the low velocity overtaking region", the first device may determine that the allowance condition is satisfied when the own vehicle SV overtakes while the vehicle velocity Vs is relatively low, so that the first device may perform the unnecessary pre-collision controls. From this viewpoint, the velocity threshold Vsth of the first device installed in the vehicle which is to be sold in the low velocity overtaking region needs to have been set at a value greater than the velocity threshold Vsth of the first device installed in the vehicle which is to be sold in the other region. The velocity threshold Vsth of the first device installed in the vehicle which is to be sold in the low velocity overtaking region has been set at a relatively small value so that the first device can reduce/decrease a possibility that the allowance condition is satisfied when the own vehicle SV overtakes the preceding vehicle while the vehicle velocity Vs is relatively low. As a result, the first device can reduce/decrease a possibility that the first device performs the respective pre-collision controls although the operation on the accelerator pedal is based on the driver's intentional operation.

The first device uses the velocity threshold table 14 to be able to set the velocity threshold Vsth to a value suitable for each of the regions in which the vehicle is to be sold in consideration of the above described region characteristics. More specifically, the velocity threshold Vsth corresponding to the high velocity wrong operation region (a destination A) has been set at the relatively great value (20 km/h) in the velocity threshold table 14. Furthermore, the velocity threshold Vsth corresponding to the low velocity overtaking region (a destination C) has been set at the relatively small value (10 km/h) in the velocity threshold table 14. The first device acquires the velocity threshold Vsth corresponding to the destination information 25 from the velocity threshold table 14, and determines whether or not the allowance condition is satisfied through determining whether or not "the accelerator operation amount AP is equal to or greater than the first operation amount threshold AP1th and the vehicle velocity Vs is equal to or smaller than the acquired velocity threshold Vsth". Therefore, the first device can determine whether or not the allowance condition is satisfied using the velocity threshold Vsth corresponding to the characteristics of the region in which the own vehicle SV travels. Consequently, the first device can reduce/decrease the possibility that the unnecessary pre-collision controls are performed and can improve/increase the possibility that the respective pre-collision controls are performed when the wrong operation is performed.

Figure 4:
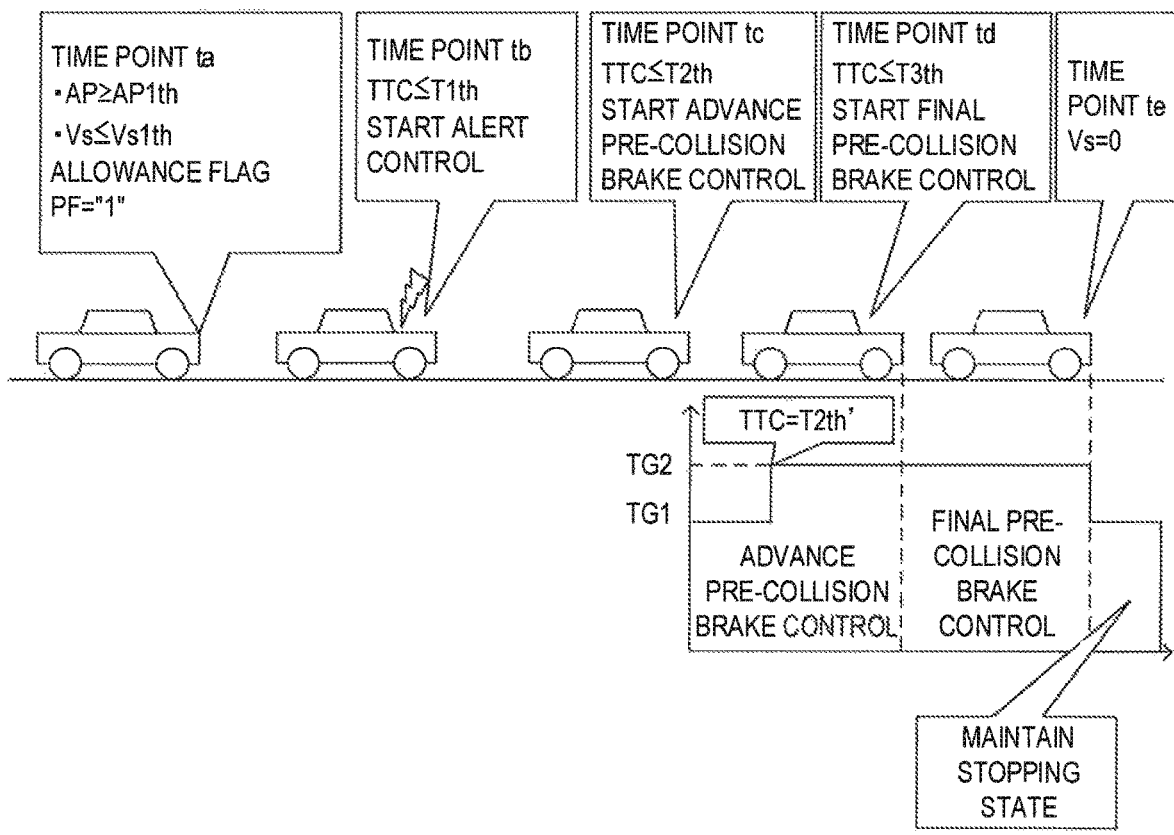
FIG. 4 is an explanatory diagram illustrating an outline of the first device operation.

The first device operation will be described using an example shown in FIG. 4. The following assumptions are made in the example shown in FIG. 4.

The destination information 25 which is acquired from the body ECU 24 has been set at the destination B.

The wrong operation has been performed from a time point before a time point ta.

The accelerator operation amount AP becomes equal to or greater than the first operation amount threshold AP1th from a value smaller than the first operation amount threshold AP1th, at the time point ta.

The vehicle velocity Vs is "15 km/h" at the time point ta.

The accelerator operation amount AP continues being equal to or greater than the control threshold APcth during a time period between the time point ta and a time point td. Further, the accelerator operation amount AP continues being equal to or greater than a second operation amount threshold AP2th which has been set at a "value equal to or smaller than the first operation amount threshold AP1th" during the time period between the time point ta and the time point td.

The predicted collision time period TTC becomes equal to or shorter than the time threshold T1th at a time point tb.

The predicted collision time period TTC becomes equal to or shorter than the time threshold T2th at a time point tc.

The predicted collision time period TTC becomes equal to or shorter than the time threshold T3th at the time point td.

The first device acquires the velocity threshold Vsth corresponding to the destination B from the velocity threshold table 14 at the time point ta. The accelerator operation amount AP at the time point ta is equal to or greater than the first operation amount threshold AP1th and the vehicle velocity Vs (15 km/h) at the time point ta is equal to or lower than the acquired velocity threshold Vsth (15 km/h). Therefore, the first device determines that the allowance condition is satisfied to set a value of an allowance flag PF to "1". None of the pre-collision controls is performed at the time point ta, because the predicted collision time period TTC is longer than the time threshold T1th.

When the allowance flag is "0", the allowance flag represents that the allowance condition has not been satisfied yet. When the allowance flag is "1", the allowance flag represents that the allowance condition has been satisfied (once).

The predicted collision time period TTC becomes equal to or shorter than the time threshold T1th from a value greater than the time threshold T1th at the time point tb. Therefore, the control start condition (hereinafter, referred to as a "first control start condition") for the alert control becomes satisfied at the time point tb. The control start condition for the alert control is a condition that the predicted collision time period TTC is equal to or shorter than the time threshold T1th and the accelerator operation amount AP is equal to or greater than the control threshold APcth. The allowance flag PF was set to "1" at the time point ta before the time point tb. Accordingly, the first device performs the alert control as the pre-collision control at the time point tb, because the control start condition for the alert control is satisfied at the time point tb and the allowance condition has been satisfied before the time point tb.

The predicted collision time period TTC becomes equal to or shorter than the time threshold T2th from a value greater than the time threshold T2th at the time point tc. Therefore, the control start condition (hereinafter, referred to as a "second control start condition") for the advanced pre-collision brake control becomes satisfied at the time point tc. The control start condition for the advanced pre-collision brake control is a condition that the predicted collision time period TTC is equal to or shorter than the time threshold T2th and the accelerator operation amount AP is equal to or greater than the control threshold APcth. The allowance flag PF was set to "1" at the time point ta before the time point tc. Accordingly, the first device performs the advanced pre-collision brake control as the pre-collision control at the time point tc, because the control start condition for the advanced pre-collision brake control is satisfied at the time point tc and the allowance condition has been satisfied before the time point tc.

The predicted collision time period TTC becomes equal to or shorter than the time threshold T3th from a value greater than the time threshold T3th at the time point td. Therefore, the control start condition (hereinafter, referred to as a "third control start condition") for the final pre-collision brake control becomes satisfied at the time point td. The control start condition for the advanced pre-collision brake control is a condition that the predicted collision time period TTC is equal to or shorter than the time threshold T3th and the accelerator operation amount AP is equal to or greater than the control threshold APcth. The allowance flag PF was set to "1" at the time point ta before the time point td. Accordingly, the first device performs the final pre-collision brake control as the pre-collision control at the time point td, because the control start condition for the final pre-collision brake control is satisfied at the time point t4 and the allowance condition has been satisfied before the time point td.

As understood from the above described example, when the control start condition that the predicted collision time period TTC is equal to or shorter than the time thresholds T(n)th and the accelerator operation amount is equal to or greater than the control threshold APcth is satisfied, the first device determines whether or not the allowance condition has been satisfied before a time point at which the control start condition becomes satisfied. If the allowance condition has been satisfied before the time point at which the control start condition becomes satisfied, the first device performs the respective pre-collision controls. On the other hand, if the allowance condition has not been satisfied before the time point at which the control start condition becomes satisfied, the first device does not perform the respective pre-collision controls. Consequently, the first device can improve/increase the possibility that the respective pre-collision controls are performed when the wrong operation is performed, and can reduce/decrease the possibility that the unnecessary pre-collision controls are performed when the intentional operation (i.e., the operation for making the own vehicle overtake the preceding vehicle) is performed.

Now, it is assumed that the destination information 25 has been set at the destination C. The velocity threshold Vsth corresponding to the destination C is lower than velocity threshold Vsth corresponding to the destination B. More specifically, The velocity threshold Vsth corresponding to the destination C has been set at "10 km/h". In this case, the accelerator operation amount AP at the time point ta is equal to or greater than the first operation amount threshold AP1th, but the vehicle velocity Vs (15 km/h) at the time point ta is greater than the velocity threshold Vsth (10 km/h). Therefore, the allowance condition is not satisfied at the time point ta. Furthermore, the allowance condition is not satisfied at the time points tb and tc. Thus, the first device determines that the accelerator operation which has made the accelerator operation amount AP become equal to or greater than the first operation amount threshold AP1th is the intentional operation for making the own vehicle SV overtake the preceding vehicle. Consequently, although the predicted collision time period TTC is equal to or shorter than the time threshold T(n)th during a time period between the time point tb and the time point td, the first device performs none of the pre-collision control during this time period.

Now, it is assumed that the destination information 25 has been set at the destination A. The velocity threshold Vsth corresponding to the destination A is higher than velocity threshold Vsth corresponding to the destination B. More specifically, the velocity threshold Vsth corresponding to the destination A has been set at "20 km/h". In this case, as with a destination B case described in FIG. 4, the allowance condition is satisfied at the time point ta, and the first device performs the respective pre-collision controls during a time period between the time point tb and the time point td. In the destination A case, if the vehicle velocity Vs is equal to or higher than "20 km/h" at a time point at which the accelerator operation amount AP is equal to or greater than the first operation amount threshold AP1th, the allowance condition is satisfied. The destination A case is different from the destination B case in the above described point.

The velocity threshold Vsth has been set to a suitable value for each of the regions (destinations) in consideration of the driver's characteristics in the velocity threshold table 14. The first device acquires the velocity threshold Vsth corresponding to the destination information 25, and determines whether or not the allowance condition is satisfied using the acquired velocity threshold Vsth. Therefore, the first device can improve/increase the possibility that the respective pre-collision controls are performed when the wrong operation is performed, and can reduce/decrease the possibility that the unnecessary pre-collision controls are performed when the intentional operation (i.e., the operation for making the own vehicle overtake the preceding vehicle) is performed.

<Specific Operation>

Figure 5:
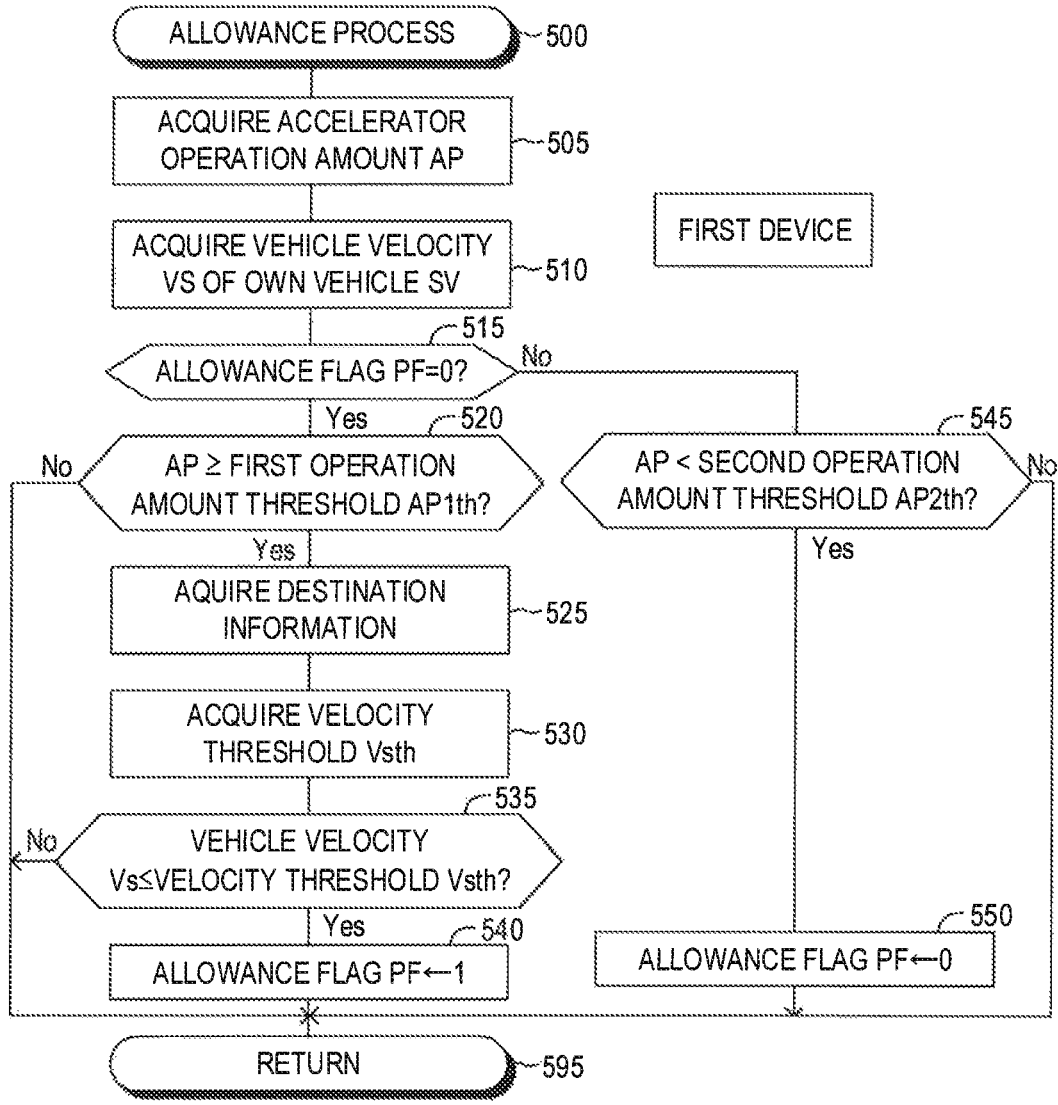
FIG. 5 is a flowchart illustrating a routine which a CPU of a pre-collision control ECU shown in FIG. 1 executes.

The CPU 11 of the pre-collision control ECU 10 executes a routine represented by a flowchart shown in FIG. 5, every time a predetermined time period elapses. The routine shown in FIG. 5 is a routine for determining whether or not the allowance condition is satisfied when the allowance condition has not been satisfied yet, and for determining whether or not an allowance cancel condition is satisfied when the allowance condition has been satisfied.

When a predetermined timing has come, the CPU 11 starts the process from Step 500 shown in FIG. 5, and proceeds to Step 505 to acquire the current accelerator operation amount AP from the accelerator opening sensor 21. Thereafter, the CPU 11 proceeds to Step 510 to acquire the vehicle velocity Vs based on the wheel pulse signals transmitted from the wheel velocity sensors 23, and proceeds to Step 515.

At Step 515, the CPU 11 determines whether or not the allowance flag PF has been set to "0". It should be noted that the allowance flag PF has been set to "0" through an initial routine which is executed when the driver performs an operation to change a position of an ignition key switch (now shown) of the own vehicle SV from an off-position to an on-position.

When the allowance flag has been set to "0", the CPU makes a "Yes" determination at Step 515 to proceed to Step 520. At Step 520, the CPU 11 determines whether or not the accelerator operation amount AP acquired at Step 505 is equal to or greater than the first operation amount threshold AP1th. The first operation amount threshold AP1th has been set at "90%".

When the accelerator operation amount AP is smaller than the first operation amount threshold AP1th, the CPU 11 makes a "No" determination at Step 520, and proceeds to Step 595 to tentatively terminate the present routine. As a result, the allowance condition is not satisfied so that the allowance flag PF does not change from "0".

On the other hand, when the accelerator operation amount AP is equal to or greater than the first operation amount threshold AP1th, the CPU 11 makes a "Yes" determination at Step 520, and executes the following Step 525 through Step 535 in order.

Step 525: The CPU 11 acquires the destination information 25 from the body ECU 24.

Step 530: The CPU 11 acquires, from the velocity threshold table 14, the velocity threshold Vsth corresponding to the destination which is represented/indicated by the destination information 25 acquired at Step 525.

Step 535: The CPU 11 determines whether or not the vehicle velocity Vs acquired at Step 510 is equal to or lower than the velocity threshold Vsth acquired at Step 530.

When the vehicle velocity Vs is higher than the velocity threshold Vsth, the CPU 11 makes a "No" determination at Step 535 (that is, the CPU 11 determines that the allowance condition has not been satisfied), and proceeds to Step 595 to tentatively terminate the present routine. As a result, the allowance condition is not satisfied so that the allowance flag PF does not change from "0".

On the other hand, when the vehicle velocity Vs is equal to or lower than the velocity threshold Vsth acquired at Step 535, the CPU 11 makes a "Yes" determination (that is, the CPU 11 determines that the allowance condition is satisfied), and proceeds to Step 540. At step 540, the CPU 11 sets the allowance flag PF to "1", and proceeds to Step 595 to tentatively terminate the present routine. As a result, the allowance flag PF changes from "0" to "1".

On the other hand, when the allowance flag PF has not been set to "0" at a time point at which the CPU 11 executes the process of Step 515, that is, when the allowance flag PF has been set to "1" and the allowance condition has been satisfied, the CPU 11 makes a "No" determination at Step 515, and proceeds to Step 545. At Step 545, the PCU 11 determines whether or not the accelerator operation amount AP acquired at Step 505 becomes smaller than the second operation amount threshold AP2th. As described above, the second operation amount threshold AP2th has been set at a value (i.e., "70%" in this example) smaller than the first operation amount threshold AP1th.

When the accelerator operation amount AP is equal to or greater than the second operation amount AP2th, the CPU 11 makes a "No" determination at Step 545, and proceeds to Step 595 to tentatively terminate the present routine. As a result, the allowance cancel condition is not satisfied so that the allowance flag does not change from "1".

On the other hand, when the accelerator operation amount AP becomes smaller than the second operation amount threshold AP2th, the CPU 11 makes a "Yes" determination at Step 545, and proceeds to Step 550. At Step 550, the CPU 11 determines that the allowance condition is satisfied to set the allowance flag to "0", and proceeds to Step 595 to tentatively terminate the present routine. As a result, the allowance flag changes from "0" to "1".

As understood from the above, when the accelerator operation amount AP is equal to or greater than the first operation amount threshold AP1th and the vehicle velocity Vs is equal to or lower than the velocity threshold Vsth corresponding to the destination, it is determined that the allowance condition is satisfied so that the allowance flag PF is set to "1". When the allowance flag PF has been set to "1", as described later, the first device is allowed/permitted to perform the respective pre-collision controls when the accelerator operation amount AP is equal to or greater than the control threshold APcth. Therefore, the first device can improve/increase the possibility that the respective pre-collision controls are performed certainly when the wrong operation is performed. When the accelerator operation amount AP becomes smaller than the second operation amount threshold AP2th after the allowance condition was satisfied once (that is, after the allowance flag PF was set to "1"), it is determined that the allowance cancel condition is satisfied so that the allowance flag is set to "0". When the allowance flag PF has been set to "0", as described later, the first device is prohibited from performing the respective pre-collision controls when the accelerator operation amount AP is equal to or greater than the control threshold APcth. Therefore, the first device can prevent itself from performing the unnecessary pre-collision controls when the driver no longer performs the wrong operation after the driver once performed the wrong operation.

The velocity threshold Vsth corresponding to the destination D has been set at "0 km/h" in the velocity threshold table 14 shown in FIG. 3. Thus, in the destination D, when the accelerator operation amount AP is equal to or greater than the first operation amount threshold AP1th and the vehicle velocity is equal to or lower than "0 km/h", the allowance condition is satisfied. However, there is no possibility that the vehicle velocity Vs is equal to or lower than the "0 km/h" at a time point at which the accelerator operation amount AP becomes equal to or greater than the first operation amount threshold AP1th, because the own vehicle SV inevitably accelerates until the accelerator operation amount AP becomes equal to or greater than the first operation amount threshold AP1th. Therefore, when the velocity threshold Vsth is "0 km/h" (i.e., in the destination D), the pre-collision controls performed when the accelerator operation amount AP is equal to or greater than the control threshold APcth is substantially prohibited.

In other words, when the respective pre-collision controls are allowed/permitted in a first specific destination, the velocity threshold Vsth corresponding to the first specific destination has been set at a value greater/higher than "0 km/h" in the velocity threshold table 14. In contrast, when the pre-collision controls are prohibited (i.e., the respective pre-collision controls are made not to be performed) in a second specific destination, the velocity threshold Vsth corresponding to the second specific destination has been set at "0 km/h" in the velocity threshold table 14. For this reason, the velocity threshold table 14 can be expressed as a table which stores information which indicates whether or not the pre-collision controls are allowed to be performed (or the pre-collision controls are prohibited) for each of the destinations.

Figure 6:
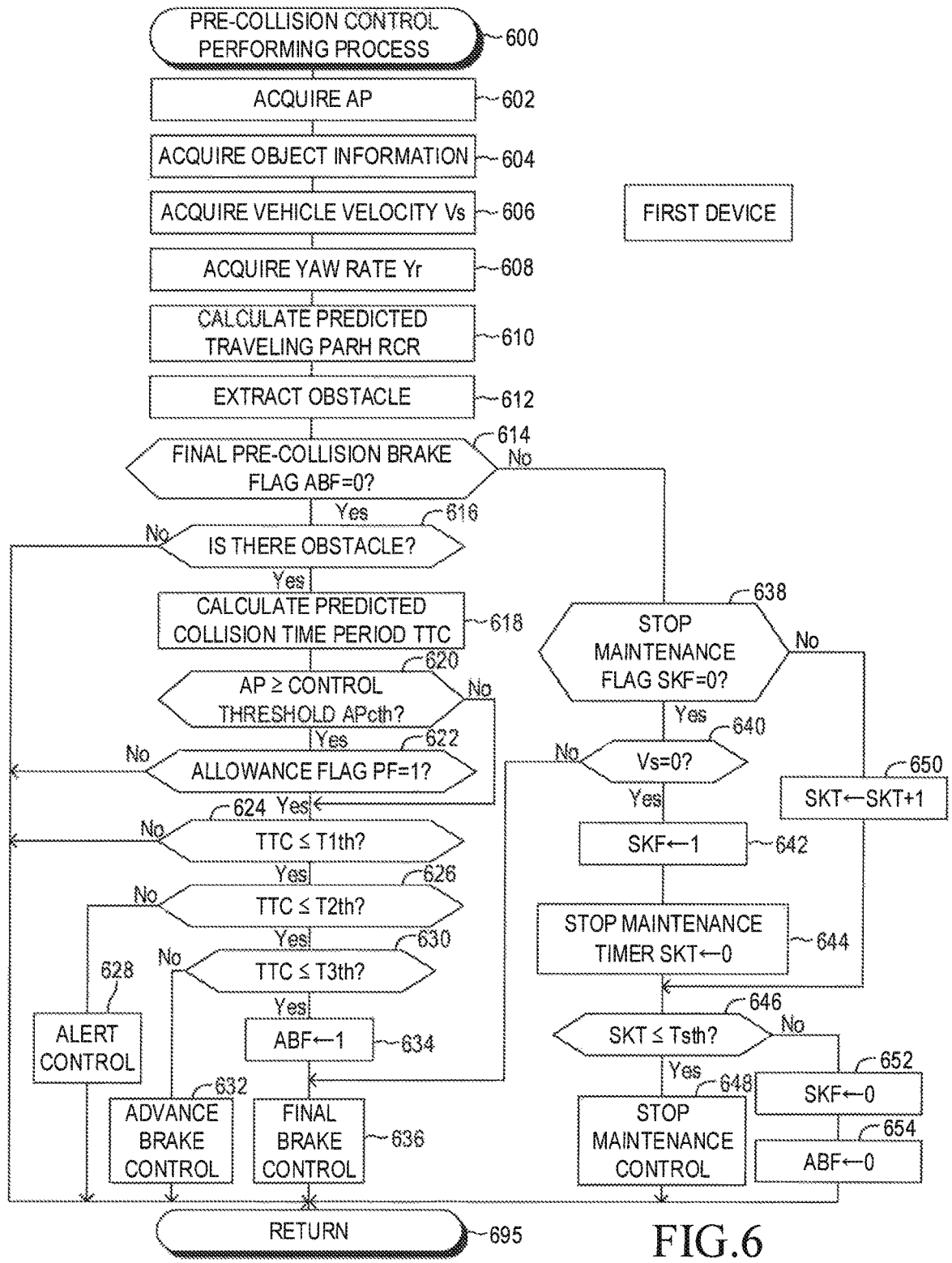
FIG. 6 is a flowchart illustrating another routine which the CPU of the pre-collision control ECU shown in FIG. 1 executes.

The CPU 11 of the pre-collision control ECU 10 executes a routine represented by a flowchart shown in FIG. 6, every time a predetermined time period elapses. The routine shown in FIG. 6 is a routine for determining whether or not the respective pre-collision controls are performed.

When a predetermined timing has come, the CPU 11 starts the process from Step 600 shown in FIG. 6 to execute the following processes from Step 602 through Step 612 in order, and proceeds to Step 614.

Step 602: The CPU 11 acquires the current accelerator operation amount AP from the accelerator opening sensor 21.

Step 604: The CPU 11 acquires the object information from the millimeter wave radar 20.

Step 606: The CPU 11 acquires the vehicle velocity Vs of the own vehicle SV based on the wheel pulse signals transmitted from the wheel velocity sensors 23.

Step 608: The CPU 11 acquires the yaw rate Yr which is generated in the own vehicle SV from the yaw rate sensor 22.

Step 610: The CPU 11 calculates a predicted traveling path RCR (refer to FIG. 2) of the own vehicle SV.

A process of Step 610 will be described in detail.

The CPU 11 calculates a turning radius of the own vehicle SV based on the velocity Vs of the own vehicle SV acquired at Step 606 and the yaw rate acquired at Step 608. Thereafter, the CPU 11 predicts/extrapolates, as the predicted traveling path RCR, a traveling path along which a center point in the width direction of the own vehicle SV (the center point PO (referring to FIG. 2) of a wheel axis connecting a left wheel and a right wheel) will move. When the yaw rate is generated, the CPU 11 predicts/extrapolates a path having an arc shape as the predicted traveling path RCR. In contrast, when the magnitude of the yaw rate is equal to "0", the CPU 11 predicts a straight path along a direction of acceleration of the own vehicle SV as the predicted traveling path RCR.

Step 612: The CPU 11 extracts, as the obstacle(s), the object(s) which has (have) the probability of colliding with the own vehicle SV from among the object(s) represented by the object information, based on the location/position and the velocity of the object point(s) and the predicted traveling path RCR of the own vehicle SV. The selected obstacle(s) may include an object(s) which is (are) predicted not to collide with the own vehicle SV but to have a narrow margin of clearance between the object(s) and the own vehicle SV (or to extremely approach the own vehicle SV).

The process of Step 612 will next be described in detail with reference to FIG. 2.

The CPU 11 predicts/extrapolates, based on the "predicted traveling path RCR having a finite length", a predicted left traveling path LEC along which a "point PL away from a left end of a vehicle-body of the own vehicle SV in the left direction by a predetermined distance αL" will move, and a predicted right traveling path REC along which a "point PR away from a right end of the vehicle-body of the own vehicle SV in the right direction by a predetermined distance αR" will move. The predicted left traveling path LEC is a path obtained by parallelly shifting the predicted traveling path RCR in the left direction of the own vehicle SV by a "distance obtained by adding a half (W/2) of the vehicle-body width W to the predetermined distance αL". The predicted right traveling path REC is a path obtained by parallelly shifting the predicted traveling path RCR to the right direction of the own vehicle SV by a "distance obtained by adding a half (W/2) of the vehicle-body width W to the predetermined distance αR". Each of the distance αL and the distance αR is a distance which is longer than or equal to "0". The distance αL and the distance αR may be the same as each other, or may be different from each other. The CPU 11 specifies/designates, as a predicted traveling path area ECA, an area between the predicted left traveling path LEC and the predicted right traveling path REC.

The CPU 11 calculates/predicts a moving trajectory of each of the objects based on the locations of each of the past objects with which the present object point is associated. Thereafter, the CPU 11 calculates/predicts a moving direction of each of the objects in relation to the own vehicle SV based on the calculated moving trajectory of each of the objects.

Thereafter, the CPU 11 selects/extracts, as one or more of the obstacles which have high probability of colliding with the own vehicle SV, one or more of the object points which have been in the predicted traveling path area ECA and which will intersect with a front end area TA of the own vehicle SV, and one or more of the object points which will be in the predicted traveling path area ECA and which will intersect with the front end area TA of the own vehicle SV, based on the predicted traveling path area ECA, the relative relationship (the relative location and the relative velocity) between the own vehicle SV and each of the object points, and the moving direction of each of the objects in relation to the own vehicle SV. The front end area TA is an area represented by a line segment between the point PL and the point PR.

The CPU 11 predicts the "trajectory/path along which the point PL will move" as the predicted left traveling path LEC and the "trajectory/path along which the point PR will move" as the predicted right traveling path REC. Therefore, if both the values αL and αR are positive values, "the object which has been in the predicted traveling path area ECA and will intersect with the front end area TA of the own vehicle SV" may include an object which is likely to pass near the left side or the right side of the own vehicle SV, and the "object which will be in the predicted traveling path area ECA and will intersect with the front end area TA of the own vehicle SV" may include an object which is likely to pass near the left side or the right side of the own vehicle SV. Accordingly, the CPU 11 can select/extract, as the obstacle, the object which has a probability of passing near the left side or the right side of the own vehicle SV.

Subsequently, the CPU 11 proceeds to Step 614 to determine whether or not a final pre-collision brake flag ABF described later has been set at "0". The final pre-collision brake flag ABF is set to "1" at a time point at which the final pre-collision brake control is started. The final pre-collision brake flag ABF is set to "0" at a time point at which a predetermined time period elapses from a time point at which the own vehicle SV stops. It should be noted that the final pre-collision brake flag ABF is set to "0" through the above described initial routine.

When the final pre-collision brake flag ABF has been set to "0", the CPU 11 makes a "Yes" determination at Step 614, and proceeds to Step 616 to determine whether or not any of the obstacle(s) has been extracted/selected at Step 612. When no obstacle has been extracted/selected at Step 612, the CPU 11 makes a "No" determination at Step 616, and proceeds to Step 695 to tentatively terminates the present routine. As a result, the pre-collision controls are not performed.

On the other hand, when at least one obstacle has been extracted/selected at Step 612, the CPU 11 makes a "Yes" determination at Step 616, and proceeds to Step 618 to calculate the predicted collision time period TTC (Time to Collision) which it takes for each of the obstacles to reach the area TA of the own vehicle SV.

Now, a calculation process of the predicted collision time period TTC of each of the obstacles is described.

The CPU 11 obtains the predicted collision time period TTC of the obstacle by dividing the distance (the relative length) between the own vehicle SV and the obstacle point by the relative velocity of the obstacle in relation to the own vehicle SV.

The predicted collision time period TTC is either one of a time period T1 or a time period T2, described below.

The time period T1 is a time (period) which it takes for the obstacle to collide with the own vehicle SV (a time period from the present time point to a predicted collision time point).

The time period T2 is a time (period) which it takes for the obstacle which has the high probability of passing near either side of the own vehicle SV to reach the closest point to the own vehicle SV (a time period from the present time point to the time point at which the own vehicle SV most closely approaches to the obstacle).

The predicted collision time period TTC is a time which it takes for the obstacle to reach the "front end area TA of the own vehicle SV" under an assumption that the obstacle and the own vehicle SV move with keeping the relative velocity and the relative moving direction at the present time period.

Furthermore, the predicted collision time period TTC represents a time period for which the first device is able to perform the respective pre-collision controls for preventing the own vehicle SV from colliding with the obstacle or a time period for which the driver is able to perform a collision preventing operation for preventing the own vehicle SV from colliding with the obstacle. The time to collision TTC is an index value (a collision index value) correlating with a probability (a collision probability) of a collision between the obstacle and the own vehicle SV. As the predicted collision time period TTC is shorter, the collision probability is higher. In contrast, the predicted collision time period TTC is longer, the collision probability is lower. It should be noted that, when a plurality of the obstacles have been extracted/selected at Step 612, the CPU select the shortest (minimum) predicted collision time period TTC among a plurality of the predicted collision time periods at Step 618.

After the process of Step 618, the CPU 11 proceeds to Step 620 to determine whether or not the accelerator operation amount AP acquired at Step 602 is equal to greater than the control threshold APcth. The control threshold APcth has been set to "90%". When the accelerator operation amount AP is equal to or greater than the control threshold APcth, the CPU 11 makes a "Yes" determination at Step 620, and proceeds to Step 622.

At Step 622, the CPU 11 determines whether or not the above described allowance flag PF has been set to "1". When the allowance flag PF has been set to "0", the CPU 11 makes a "No" determination at Step 622, and proceeds to Step 695 to tentatively terminate the present routine. The situation where the CPU 11 makes a "No" determination at Step 622 means the situation where the accelerator operation amount AP at the present time point is equal to or greater than the control threshold APcth and the allowance condition has not been satisfied yet. An example of such a situation may be a situation where the driver presses/steps the accelerator pedal greatly when the vehicle velocity Vs is higher than the velocity threshold Vsth so that the accelerator operation amount AP becomes equal to or greater than the control threshold APcth. In this situation, the driver is likely to perform the intentional operation for making the own vehicle SV overtake the preceding vehicle. Therefore, even if the predicted collision time period TTC is equal to or shorter than the time thresholds T(n)th, the CPU 11 does not perform the respective pre-collision controls. Therefore, in this situation, the CPU 11 tentatively terminates the present routine without executing processes for performing the pre-collision controls (Step 624 through Step 636). As a result, any one of the pre-collision controls is not performed.

On the other hand, when the allowance flag PF has been set to "1", the CPU 11 makes a "Yes" determination at Step 622, and proceeds to Step 624. When the accelerator operation amount AP is equal to or greater than the control threshold APcth and the allowance flag PF has been set to "1", the operation performed on the accelerator pedal at the present time point is likely to be the wrong operation, since the allowance condition has been satisfied before the present time point. Therefore, when the predicted collision time period TTC is equal to or shorter than the time thresholds T(n)th, the CPU 11 needs to perform the respective pre-collision controls. Accordingly, at Step 624, the CPU 11 determines whether or not the predicted collision time period TTC calculated at Step 624 is equal to or shorter than the time threshold T1th for the alert control.

When the predicted collision time period TTC is longer than the time threshold T1th, the CPU 11 makes a "No" determination at Step 624, and proceeds to Step 695 to tentatively terminate the present routine. In this case, none of the pre-collision controls is performed, because the predicted time period TTC is longer than the time threshold T1th which is the longest among the time thresholds T(n)th.

When the predicted collision time period TTC is equal to shorter than the time thresholds time period T1th, the CPU 11 makes a "Yes" determination at Step 624, and proceeds to Step 626 to determine whether or not the predicted time period TTC is equal to shorter than the time threshold T2th for the advanced pre-collision brake control.

When the predicted collision time period TTC is longer than the time threshold T2th (that is, when the predicted collision time period TTC is longer than the time threshold T2th and equal to or shorter than the time threshold T1th), the CPU 11 makes a "No" determination at Step 626, and proceeds to Step 628. At Step 628, the CPU 11 performs the above described alert control (alert), and proceeds to Step 695 to tentatively terminate the present routine. More specifically, the CPU 11 transmits the display instruction information to the display unit 30 at Step 628 so as to display the above described alert screen on the display unit 30. In addition, the CPU 11 transmits the output instruction information to the speaker 31 so as to output/generate the above described alert sound from the speaker 31.

Even after the CPU 11 has performed the alert control once, the CPU 11 stops/cancels performing the alert control when at least one of the following conditions (1A) through (3A) is satisfied owing to the collision preventing operation by the driver, a moving state change of the obstacle, and the like.

Condition (1A): No obstacle is detected ("No" at Step 616).

Condition (2A): The allowance flag becomes "0" when and after the alert control was started on the condition that the allowance flag was "1" ("No" at Step 622).

Condition (3A): The predicted collision time period TTC becomes longer than the time threshold T1th ("No" at Step 624).

On the other hand, when the predicted collision time period TTC is equal to or shorter than the time threshold T2th, the CPU 11 makes a "Yes" determination at Step 626, and proceeds to Step 630 to determine whether or not the predicted collision time period TTC is equal to or shorter than the time threshold T3th for the final pre-collision brake control.

When the predicted collision time period TTC is longer than the time threshold T3th (that is, when the predicted collision time period TTC is longer than the time threshold T3th and equal to or shorter than the time threshold T2th), the CPU 11 makes a "No" determination at Step 630, and proceeds to Step 632. At Step 632, the CPU 11 performs the above described advanced pre-collision brake control, and proceeds to Step 695 to tentatively terminate the present routine. More specifically, when the shortest (minimum) predicted collision time period TTC is equal to or shorter than the time threshold T2th and longer than a time threshold T2th' (refer to FIG. 4), the CPU 11 calculates a target deceleration TG1 based on the distance between the own vehicle SV and the object having the shortest TTC, and the relative velocity of the object having the shortest TTC in relation to the own vehicle SV at this time point. For example, the target deceleration TG1 is calculated so as to be a deceleration necessary for the own vehicle SV to stop before the own vehicle SV collides with the obstacle which was extracted at Step 612 and has the shortest TTC. Thereafter, the CPU 11 transmits the brake instruction signal for decelerating the own vehicle SV at the target deceleration TG1 to the brake ECU 32, and transmits the torque decreasing instruction signal to the engine ECU 36. On the other hand, when the shortest (minimum) predicted collision time period TTC calculated at Step 618 is equal to or shorter than the time threshold T2th' and longer than time threshold T3th, the CPU 11 calculates a target deceleration TG2 based on the distance between the own vehicle SV and the object having the shortest TTC, and the relative velocity of the object having the shortest TTC in relation to the own vehicle SV at this time point. The target deceleration TG2 is calculated so as to be greater than the target deceleration TG1 and a deceleration necessary for the own vehicle SV to stop before the own vehicle SV collides with the obstacle which was extracted at Step 612 and has the shortest TTC. In some embodiments, the target deceleration TG2 is calculated so as to be greater than the target deceleration TG1 and a maximum deceleration which is able to be generated by the own vehicle SV. Thereafter, the CPU 11 transmits the brake instruction signal for decelerating the own vehicle SV at the target deceleration TG2 to the brake ECU 32, and transmits the torque decreasing instruction signal to the engine ECU 36. The own vehicle SV is decelerated more rapidly at the target deceleration TG2 than at the target deceleration TG1. It should be noted that the CPU 11 continues performing the alert control while the CPU 11 is performing the advanced pre-collision brake control.

Even after the CPU 11 has performed the advanced pre-collision brake control once, the CPU 11 stops/cancels performing the advanced pre-collision brake control when at least one of the following conditions (1 B) through (3B) is satisfied owing to the collision preventing operation by the driver, a moving state change of the obstacle, and the like.

Condition (1 B): No obstacle is detected ("No" at Step 616).

Condition (2B): The allowance flag becomes "0" when and after the advanced pre-collision brake control was started on the condition that the allowance flag was "1" ("No" at Step 622).

Condition (3B): The predicted collision time period TTC becomes longer than the time threshold T2th ("No" at Step 624 and "No" at Step 626).

On the other hand, when the predicted collision time period TTC is equal to or shorter than the time threshold T3th, the CPU 11 makes a "Yes" determination at Step 630, and proceeds to Step 634. At Step 634, the CPU 11 sets the final pre-collision brake flag ABF to "1", and proceeds to Step 636. At Step 636, the CPU 11 performs the final pre-collision brake control, and proceeds to Step 695 to tentatively terminate the present routine. More specifically, the CPU 11 transmits the brake instruction signal for decelerating the own vehicle SV at the target deceleration TG2 to the brake ECU 32 and the torque decreasing instruction signal to the engine ECU 36. It should be noted that the CPU 11 continues performing the alert control while the CPU 11 is performing the final pre-collision brake control.

The final pre-collision brake control is different from the advanced pre-collision brake control in that once the CPU 11 starts the final pre-collision brake control, the CPU 11 continues braking the own vehicle SV at the target deceleration TG2 until the vehicle velocity Vs becomes "0" (the own vehicle SV stops) regardless of a presence/absence of the obstacle and the predicted collision time period TTC. The vehicle velocity Vs becomes "0" through the final pre-collision brake control at time point te in FIG. 4. The CPU 11 has set the target deceleration to the target deceleration TG1 in order to maintain the vehicle velocity Vs at "0" during a time period from "the time point (the time point te) at which the own vehicle SV stops" to a time point at which a predetermined time period elapses from the time point te in the final pre-collision brake control. In this case, the own vehicle SV is not decelerated at the target deceleration TG1 because the own vehicle SV stops. Therefore, the brake ECU 32 determines that the braking force is insufficient so that the brake ECU 32 continues driving the braking actuator 34.

When the CPU executes the present routine after the final pre-collision brake flag ABF was set to "1" at Step 634 and the final pre-collision brake control was started at Step 636, the CPU 11 makes a "No" determination at Step 614, and proceeds to Step 638.

At Step 638, the CPU 11 determines whether or not a stop maintenance flag SKF has been set to "0". The stop maintenance flag SKF is set to "1" at a time point at which the vehicle velocity Vs becomes "0" while the CPU 11 is performing the final pre-collision brake control. The stop maintenance flag SKF is set to "0" at the time point at which the predetermined time period elapses from the time point at which the vehicle velocity Vs becomes "0" owing to the final pre-collision brake control. In addition, the stop maintenance flag SKF is set to "0" through the initial routine.

When the stop maintenance flag SKF has been set to "0", the CPU 11 makes a "Yes" determination at Step 638, and proceeds to Step 640 to determine whether or not the vehicle velocity Vs acquired at Step 606 is "0".

When the vehicle velocity Vs is not "0", the CPU 11 makes a "No" determination at Step 640, and proceeds to Step 636 to perform the final pre-collision brake control so as to decelerate the own vehicle SV. Thereafter, the CPU 11 proceeds to Step 695 to tentatively terminate the present routine.

On the other hand, when the vehicle velocity VS becomes "0" through the final pre-collision brake control, the CPU 11 makes a "Yes" determination at Step 640, and proceeds to Step 642. At Step 642, the CPU 11 sets the stop maintenance flag SKF to "1", and proceeds to Step 644. At Step 644, the CPU 11 sets a stop maintenance timer SKT to "0" so as to initialize the stop maintenance timer SKT, and proceeds to Step 646. The stop maintenance timer SKT is used for determining whether or not the predetermined time period elapses from the time point at which the vehicle velocity Vs becomes "0" owing to the final pre-collision brake control.

At Step 646, the CPU 11 determines whether or not the stop maintenance timer SKT is equal to or smaller than a timer threshold Tsth. When the stop maintenance timer SKT is equal to or smaller than the timer threshold Tsth, the CPU 11 makes a "Yes" determination at Step 646, and proceeds to Step 648. At Step 648, the CPU 11 performs a stop maintenance control for maintaining a stop state of the own vehicle SV (in other words, maintaining the vehicle velocity Vs at "0") as a part of the final pre-collision brake control. More specifically, at Step 648, the CPU 11 transmits the brake instruction signal for decelerating the own vehicle SV at the target deceleration TG1 to the brake ECU 32, and transmits the torque decreasing instruction signal to the engine ECU 36. Thereafter, the CPU 11 proceeds to Step 695 to tentatively terminate the present routine.

When the CPU 11 proceeds to Step 638 in the present routine which the CPU 11 again started to execute after the stop maintenance flag SKF was set to "1" at Step 642, the CPU 11 makes a "No" determination at Step 638, and proceeds to Step 650. At Step 650, the CPU 11 sets the stop maintenance timer SKT to a value obtained by adding "1" to the current stop maintenance timer SKT, and proceeds to Step 646.

Accordingly, the CPU 11 adds "1" to the stop maintenance timer SKT every time the process of Step 650 is executed, and continues performing the stop maintenance control at Step 648 during a time period from a time point at which the CPU 11 sets the stop maintenance flag to "1" at Step 642 to a time point at which the CPU 11 makes a "No" determination at Step 646 (that is, during a time period from a time point at which the vehicle velocity Vs becomes "0" owing to the final pre-collision brake control to a time point at which the predetermined time period elapses from the time point at which the vehicle velocity Vs becomes "0").

When the CPU 11 proceeds to Step 646 in the present routine which is executed after the stop maintenance timer SKT became greater than the timer threshold Tsth, the CPU 11 makes a "No" determination at Step 646, and proceeds to Step 652. At Step 652, the CPU 11 sets the stop maintenance flag SKF to "0", and proceeds to Step 654 to set the final pre-collision brake flag ABF to "0". Thereafter, the CPU 11 proceeds to Step 695 to tentatively terminate the present routine.

When the predicted collision time period TTC is equal to or shorter than the time threshold T3th, the final pre-collision brake flag ABF is set to "1" and the final pre-collision brake control is started. Once the final pre-collision brake control is started, the final pre-collision brake flag ABF is not set to "0" until the predetermined time period elapses from the time point at which the vehicle velocity Vs becomes "0". When the final pre-collision brake flag ABF has been set to "1", the CPU 11 makes a "No" determination at Step 614. As a result, the CPU 11 does not execute the process of Step 616 through Step 634. That is, once the final pre-collision brake control is performed, the own vehicle SV is decelerated until the vehicle velocity Vs becomes "0" regardless of the predicted collision time period TTC. The stop state of the own vehicle SV is maintained until the predetermined time period elapses from the time point at which the vehicle velocity Vs becomes "0". The CPU 11 does not use the predicted collision time period TTC while the CPU 11 is performing the final pre-collision brake control, because "the millimeter wave radar detection error in detecting "the location and the relative velocity" of the object which is present in a short distance area from the millimeter wave radar 20" tends to be great.

Meanwhile, when the accelerator operation amount AP acquired at Step 602 is smaller than the control threshold APcth at the time point at which the CPU 11 executes the process of Step 620, the CPU 11 makes a "No" determination at Step 620. Thereafter, the CPU 11 proceeds the processes after Step 624 without executing the process of Step 622. That is, in the case where the accelerator operation amount AP is smaller than the control threshold APcth, regardless of the allowance flag PF (regardless of whether or not the allowance condition has been satisfied), the CPU 11 performs the respective pre-collision controls when the predicted collision time period TTC is equal to or shorter than the time thresholds T(n)th, and the CPU 11 does not perform the respective pre-collision controls when the predicted collision time period TTC is longer than the time threshold T1th (which is the longest threshold among the time thresholds T(n)).

As understood from the above example, when "the allowance condition that the accelerator operation amount AP is equal to or greater than the first operation amount threshold AP1th and the vehicle velocity Vs is equal to or smaller than the velocity threshold Vsth" has been satisfied, the CPU 11 sets the allowance flag to "1" at Step 540 shown in FIG. 5. When the accelerator operation amount AP is equal to or greater than the control threshold APcth and the allowance flag has been set to "1", the CPU 11 makes a "Yes" determination at Step 622 shown in FIG. 6. In this case, when the predicted collision time period TTC is equal to or shorter than the time thresholds T(n)th, the CPU 11 performs the respective pre-collision controls. Therefore, the first device can improve/increase the possibility that the respective pre-collision controls are performed certainly when the collision probability becomes high due to the wrong operation which is performed on the accelerator.

On the other hand, if a situation does not occur where the accelerator operation amount AP is equal to or greater than the first operation amount AP1th and the vehicle velocity Vs is equal to or lower than the velocity threshold Vsth, the allowance condition is not satisfied. Therefore, the allowance flag continues being "0". When the accelerator operation amount AP is equal to or greater than the control threshold APcth and the allowance flag PF has been set to "0" (that is, the allowance condition has not been satisfied), the CPU 11 makes a "No" determination at Step 622 shown in FIG. 6. In this case, the CPU 11 does not perform any of the pre-collision controls, and tentatively terminates the routine shown in FIG. 6. This allows the first device to determine that the driver is performing the intentional operation, when the driver presses/steps the accelerator pedal greatly (that is, when the accelerator operation amount AP is equal to or greater than the control threshold APcth) while the driver is not performing the wrong operation on the accelerator pedal and the collision probability becomes high. In this case, the first device does not perform any of the pre-collision controls. Accordingly, the first device can reduce/decrease the possibility that the unnecessary pre-collision controls are performed while the driver is performing the intentional operation.

In addition, both the destination information 25 and the velocity threshold table 14 have been stored in the first device. The destination information 25 represents (or is indicative of) the destination (place of destination) of the own vehicle SV. The velocity threshold table 14 includes/stores the information on the velocity threshold Vsth corresponding to each of the destinations. The destination information 25 is acquired at Step 525 shown in FIG. 5, and the velocity threshold Vsth corresponding to the destination represented by the acquire destination information 25 is acquired at Step 530. The CPU 11 determines whether or not the vehicle velocity Vs at the present time point is equal to or lower than the velocity threshold Vsth acquired at Step 530. In the velocity threshold table 14, the velocity threshold Vsth corresponding to the low velocity overtaking region region has been set to the relatively low value (refer to the destination C), and the velocity threshold Vsth corresponding to the high velocity wrong operation region has been set to the relatively high value (refer to the destination A). Therefore, when the own vehicle SV travels in the low velocity overtaking region, the possibility that the allowance condition is satisfied can be reduced/decreased even if the own vehicle SV starts overtaking the preceding vehicle when the vehicle velocity Vs is relatively low, so that the possibility that the unnecessary pre-collision controls are performed can be reduce/decreased. In addition, when the own vehicle SV travels in the high velocity wrong operation region, "the possibility that the allowance condition is satisfied at a time point at which the wrong operation is performed while the velocity Vs of the own vehicle SV is relatively high" can be increased. Accordingly, the possibility that the respective pre-collision controls are performed when the wrong operation is performed can be increased.

Second Embodiment

A driving support device (hereinafter, referred to as a "second device") according to a second embodiment of the present disclosure will be next described. The second device is different from the first device only in that the a velocity threshold table 70 shown in FIG. 7 in place of the velocity threshold table 14 shown in FIG. 3 has been stored in the ROM 12 included in the pre-collision control ECU 10. This velocity threshold table 70 is a table for defining the velocity threshold Vsth for each pre-collision control (that is, for each of the alert control, the advanced pre-collision brake control, and the final pre-collision brake control) corresponding to each of the destinations.

Figure 7:
FIG. 7 is an explanatory diagram illustrating a velocity threshold table of a driving support device (a second device) according to a second embodiment of the present disclosure.

The velocity threshold table 14 of the first device defines the same velocity thresholds Vsth for all of the pre-collision controls as each other. In other words, in the velocity threshold table 14, a single value is commonly set to be used as the velocity threshold Vsth for all of the pre-collision controls for each of the destinations. In contrast, as shown in FIG. 7, the velocity threshold table 70 can define the velocity threshold Vsth for each of the pre-collision controls independently from each other. In other words, in the velocity threshold table 70, an independent single value is set to be used as the velocity threshold Vsth for each of the pre-collision controls for each of the destinations. Therefore, the allowance condition for the alert control, the allowance condition for the advanced pre-collision brake control, and the allowance condition for the final pre-collision brake control can be set independently from each other.

Figure 8:
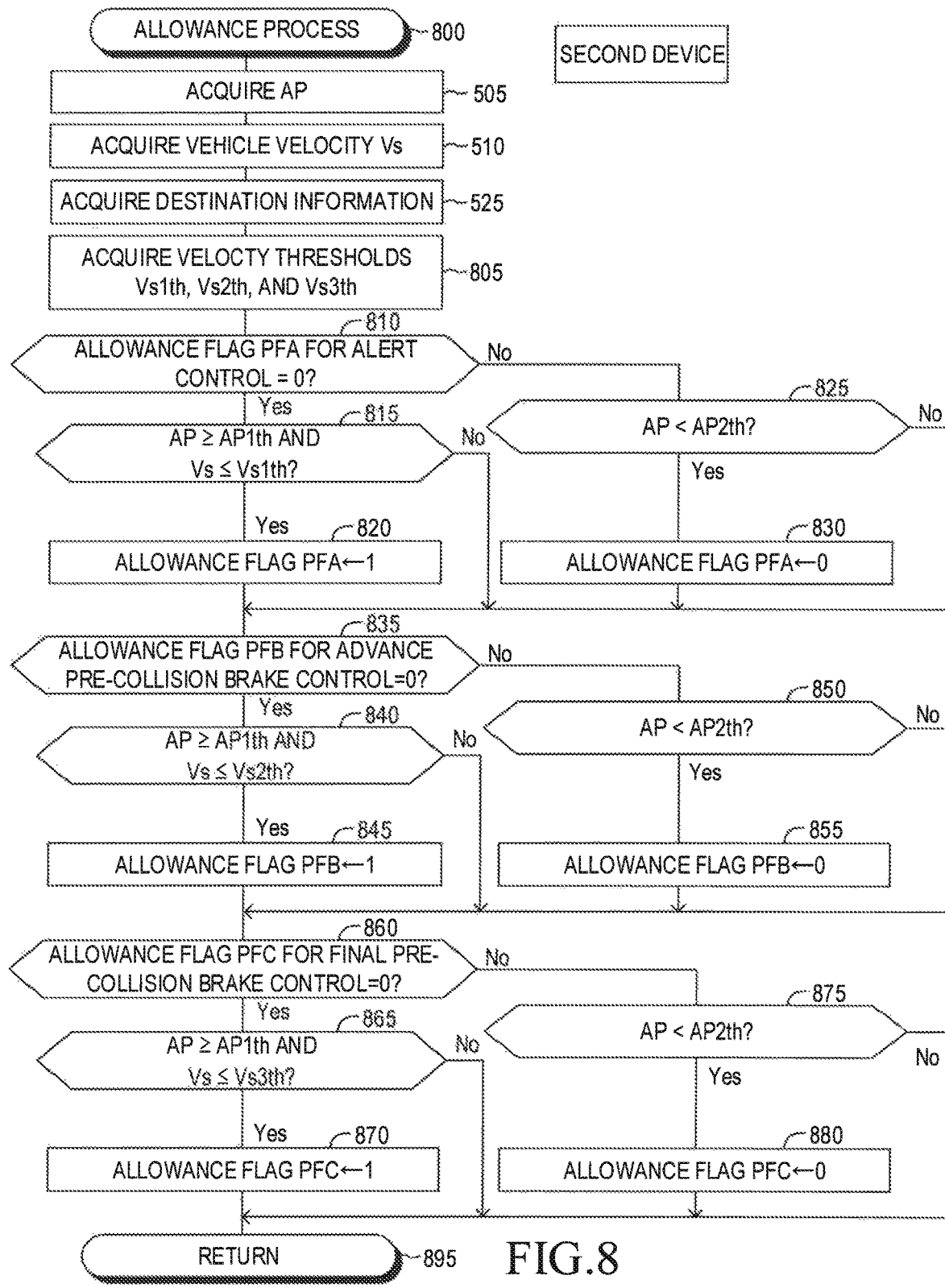
FIG. 8 is a flowchart illustrating a routine which a CPU of a pre-collision control ECU according to the second device.

More specifically, the CPU 11 of the pre-collision control ECU 10 according to the second device executes "a routine for executing an allowance process" represented by a flowchart shown in FIG. 8, every time a predetermined time period elapses. It should be noted that (values of) "an allowance flag PFA for the alert control, an allowance flag PFB for the advanced pre-collision brake control, and an allowance flag PFC for the final pre-collision brake control" are changed through this routine. Furthermore, (the values of) these flags have been set to "0" through the above described initial routine.

When a predetermined timing has come, the CPU 11 starts the process from Step 800, and executes the processes of Step 505, Step 510, and Step 525 in order. Subsequently, the CPU 11 proceeds to Step 805 to acquire, from the velocity threshold table 70, "the velocity threshold (Vs1th, Vs2th, and Vs3th) for each of the pre-collision controls" corresponding to the destination represented by the destination information 25 acquired at Step 525.

Subsequently, the CPU 11 proceeds to Step 810 to determine whether or not the flag PFA has been set to "0". When the flag PFA has been set to "0", the CPU 11 makes a "Yes" determination at Step 810, and proceeds to Step 815 to determine whether or not the allowance condition for the alert control is satisfied. The allowance condition for the alert control is satisfied when both of the following two conditions are satisfied.

The accelerator operation amount AP is equal to or greater than the first operation amount AP1th.

The vehicle velocity Vs is equal to or lower than the velocity threshold Vs1th for the alert control.

When the allowance condition for the alert control is satisfied, the CPU 11 makes a "Yes" determination at Step 815, and proceeds to Step 820. At Step 820, the CPU 11 sets the flag PFA to "1", and proceeds to Step 835. In contrast, when the allowance condition for the alert control is not satisfied, the CPU 11 makes a "No" determination at Step 815, and proceeds to Step 835 directly.

On the other hand, when the flag PFA has not been set to "0" at the time point at which the CPU 11 executes the process of Step 810, the CPU 11 makes a "No" determination at Step 810, and proceeds to Step 825 to determine whether or not the accelerator operation amount AP is smaller than the second operation amount threshold AP2th. When the accelerator operation amount AP is smaller than the second operation amount threshold AP2th, the CPU 11 makes a "Yes" determination at Step 825, and proceeds to Step 830. At Step 830, the CPU 11 sets the flag PFA to "0", and proceeds to Step 835. When the accelerator operation amount AP is equal to or greater than the second operation amount threshold AP2th, the CPU 11 makes a "No" determination at Step 825, and proceeds to Step 835 directly.

At Step 835, the CPU 11 determines whether or not the flag PFB has been set to "0". When the flag PFB has been set to "0", the CPU 11 makes a "Yes" determination at Step 835, and proceeds to Step 840 to determine whether or not the allowance condition for the advanced pre-collision brake control is satisfied. The allowance condition for the advanced pre-collision brake control is satisfied when both of the following two conditions are satisfied.

The accelerator operation amount AP is equal to or greater than the first operation amount threshold AP1th.

The vehicle velocity Vs is equal to or lower than the velocity threshold Vs2th for the advanced pre-collision brake control.

When the allowance condition for the advanced pre-collision brake control is satisfied, the CPU 11 makes a "Yes" determination at Step 840, and proceeds to Step 845. At Step 845, the CPU 11 sets the flag PFB to "1" to proceed to Step 860. In contrast, when the allowance condition for the advanced pre-collision brake control is not satisfied, the CPU 11 makes a "No" determination at Step 840, and proceeds to Step 860 directly.

On the other hand, when the flag PFB has not been set to "0" at the time point at which the CPU 11 executes the process of Step 835, the CPU 11 makes a "No" determination at Step 835, and proceeds to Step 850 to determine whether or not the accelerator operation amount AP is smaller than the second operation amount threshold AP2th. When the accelerator operation amount AP is smaller than the second operation amount threshold AP2th, the CPU 11 makes a "Yes" determination at Step 850, and proceeds to Step 855. At Step 855, the CPU 11 sets the flag PFB to "0", and proceeds to Step 860. When the accelerator operation amount AP is equal to or greater than the second operation amount threshold AP2th, the CPU 11 makes a "No" determination at Step 850, and proceeds to Step 860 directly.

At Step 860, the CPU 11 determines whether or not the flag PFC has been set to "0". When the flag PFC has been set to "0", the CPU 11 makes a "Yes" determination at Step 860, and proceeds to Step 865 to determine whether or not the allowance condition for the final pre-collision brake control is satisfied. The allowance condition for the final pre-collision brake control is satisfied when both of the following two conditions are satisfied.

The accelerator operation amount AP is equal to or greater than the first operation amount threshold AP1th.

The vehicle velocity Vs is equal to or lower than the velocity threshold Vs3th for the final pre-collision brake control.

When the allowance condition for the final pre-collision brake control is satisfied, the CPU 11 makes a "Yes" determination at Step 865, and proceeds to Step 870. At Step 870, the CPU 11 sets the flag PFC to "1" to proceed to Step 895. In contrast, when the allowance condition for the final pre-collision brake control is not satisfied, the CPU 11 makes a "No" determination at Step 865, and proceeds to Step 895 directly.

On the other hand, when the flag PFC has not been set to "0" at the time point at which the CPU 11 executes the process of Step 860, the CPU 11 makes a "No" determination at Step 860, and proceeds to Step 875 to determine whether or not the accelerator operation amount AP is smaller than the second operation amount threshold AP2th. When the accelerator operation amount AP is smaller than the second operation amount threshold AP2th, the CPU 11 makes a "Yes" determination at Step 875, and proceeds to Step 880. At Step 880, the CPU 11 sets the flag PFC to "0", and proceeds to Step 895. When the accelerator operation amount AP is equal to or greater than the second operation amount threshold AP2th, the CPU 11 makes a "No" determination at Step 875, and proceeds to Step 895 directly. At Step 895, the CPU 11 tentatively terminates the present routine.

Figure 9:
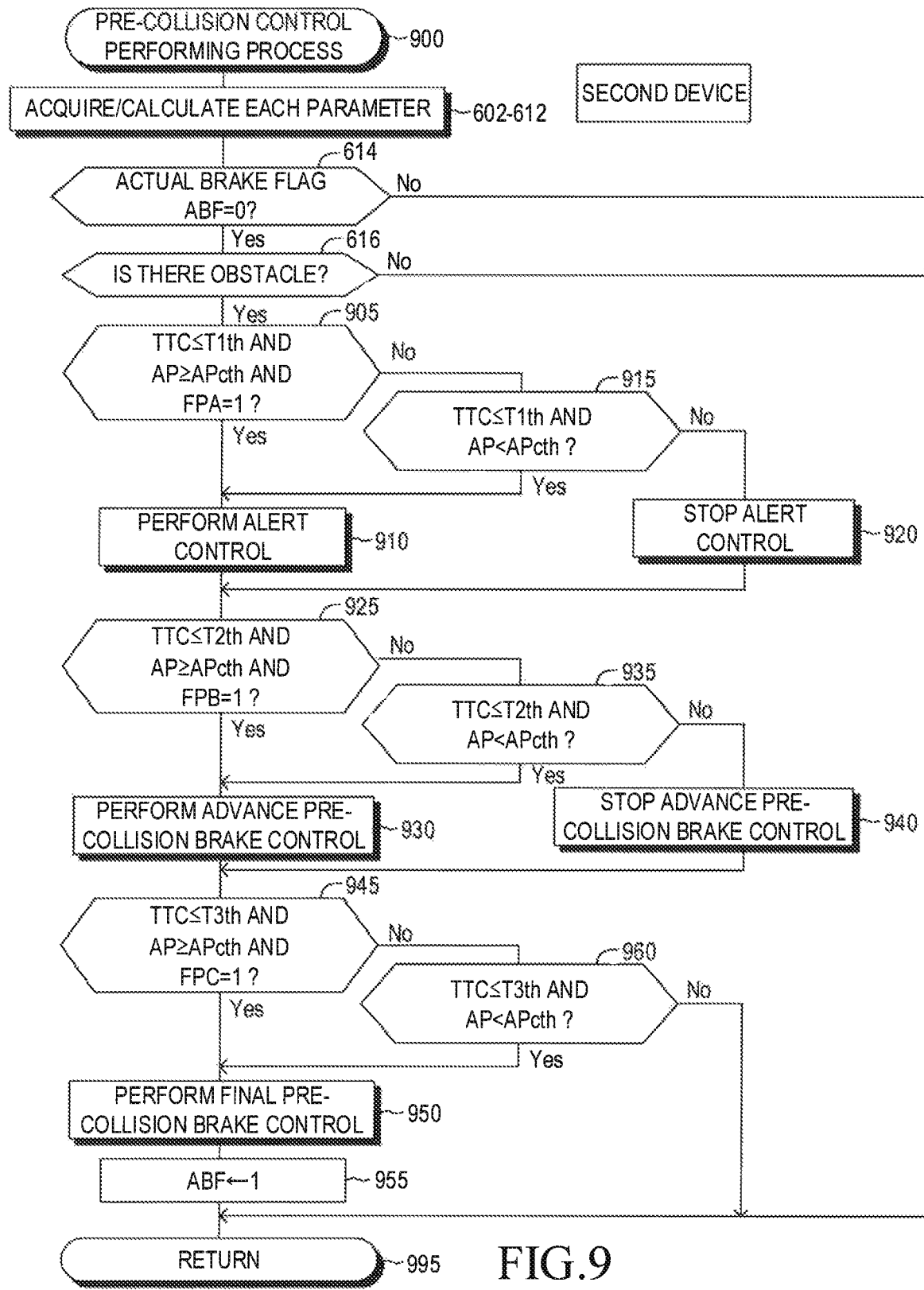
FIG. 9 is a flowchart illustrating another routine which the CPU of the pre-collision control ECU according to the second device.

The CPU 11 executes a routine for performing a pre-collision control performing process represented by a flowchart shown in FIG. 9, every time a predetermined time period elapses. It should be noted that the final pre-collision brake flag ABF is set to "0" through the above described initial routine.

When a predetermined timing has come, the CPU 11 starts the process from Step 900, and executes the processes of Step 602 through Step 612 in order, so as to acquire the various types of the parameters. Subsequently, the CPU 11 proceeds to Step 614 to determine whether or not the final pre-collision brake flag ABF has been set to "0". When the final pre-collision brake flag ABF has not been set to "0", the CPU 11 makes a "No" determination at Step 614, and proceeds to Step 995 to tentatively terminate the present routine.

When the final pre-collision brake control has been set to "0", the CPU 11 makes a "Yes" determination at Step 614, and proceeds to Step 616 to determine whether or not at least one obstacle has been extracted. When no obstacle has been extracted, the CPU 11 makes a "No" determination at Step 616, and proceeds to Step 995 to tentatively terminate the present routine.

When at least one obstacle has been extracted, the CPU 11 makes a "Yes" determination at Step 616, and proceeds to Step 905 to determine whether or not a first performance condition for the alert control. The first performance condition for the alert control is satisfied when all of the following three conditions are satisfied. Note that the predicted collision time period TTC is the shortest (minimum) TTC among the predicted collision time period(s) of the extracted obstacles. This point is applied to cases described later.

The predicted collision time period TTC is equal to or shorter than the time threshold T1th.

The accelerator operation amount AP is equal to or greater than the control threshold APcth.

The allowance flag PFA for the alert control has been set to "1".

When the first performance condition is satisfied, the CPU 11 makes a "Yes" at Step 905, proceeds to Step 910 to perform the alert control, and proceeds to Step 925. In contrast, when the first performance condition is not satisfied, the CPU 11 makes a "No" at Step 905, and proceeds to Step 915 to determine whether or not a second performance condition for the alert control. The second performance condition for the alert control is satisfied when all of the following two conditions are satisfied.

The predicted collision time period TTC is equal to or shorter than the time threshold T1th.

The accelerator operation amount AP is smaller than the control threshold APcth.

When the second performance condition for the alert control is satisfied, the CPU 11 makes a "Yes" determination at Step 915, proceeds to Step 910 to perform the alert control, and proceeds to Step 925. In contrast, when the second performance condition for the alert control is not satisfied, the CPU 11 makes a "No" determination at Step 915 to proceed to Step 920. At Step 920, if the CPU 11 is performing the alert control, the CPU 11 stops/cancels the alert control, and proceeds to Step 925. If the CPU 11 is not performing the alert control, the CPU 11 executes no process at Step 920, and proceeds to Step 925.

At Step 925, the CPU 11 determines whether or not a first performance condition for the advanced pre-collision brake control is satisfied. The first performance condition for the advanced pre-collision brake control is satisfied when all of the following three conditions are satisfied.

The predicted collision time period TTC is equal to or shorter than the time threshold T2th.

The accelerator operation amount AP is equal to or greater than the control threshold APcth.

The allowance flag PFB for the advanced pre-collision brake control has been set to "1".

When the first performance condition for the advanced pre-collision brake control is satisfied, the CPU 11 makes a "Yes" determination at Step 925, proceeds to Step 930 to perform the advanced pre-collision brake control, and proceeds to Step 945. In contrast, when the first performance condition for the advanced pre-collision brake control is not satisfied, the CPU 11 makes a "No" determination at Step 925, and proceeds to Step 935 to determine whether or not the second performance condition for the advanced pre-collision brake control is satisfied. The second performance condition for the advanced pre-collision brake control is satisfied when all of the following two conditions are satisfied.

The predicted collision time period TTC is equal to or shorter than the time threshold T2th.

The accelerator operation amount AP is smaller than the control threshold APcth.

When the second performance condition for the advanced pre-collision brake control is satisfied, the CPU 11 makes a "Yes" determination at Step 935, proceeds to Step 930 to perform the advanced pre-collision brake control, and proceeds to Step 945. In contrast, when the second performance condition for the advanced pre-collision brake control is not satisfied, the CPU 11 makes a "No" determination at Step 935 to proceed to Step 940. At Step 940, if the CPU 11 is performing the advanced pre-collision brake control, the CPU 11 stops/cancels the advanced pre-collision brake control, and proceeds to Step 945. If the CPU 11 is not performing the advanced pre-collision brake control, the CPU 11 executes no process at Step 940, and proceeds to Step 945.

At Step 945, the CPU 11 determines whether or not a first performance condition for the final pre-collision brake control is satisfied. The first performance condition for the final pre-collision brake control is satisfied when all of the following three conditions are satisfied.

The predicted collision time period TTC is equal to or shorter than the time threshold T3th.

The accelerator operation amount AP is equal to or greater than the control threshold APcth.

The allowance flag PFC for the final pre-collision brake control has been set to "1".

When the first performance condition for the final pre-collision brake control is satisfied, the CPU 11 makes a "Yes" determination at Step 945, proceeds to Step 950 to perform the final pre-collision brake control. The CPU 11 continues performing the final pre-collision brake control until the vehicle velocity Vs becomes "0", and continues performing the final pre-collision brake control until the predetermined time period elapses from the time point at which the vehicle velocity becomes "0", in the same manner as the final pre-collision brake control performed by the first device. Subsequently, the CPU 11 proceeds to Step 955 to set the flag ABF to "1", and proceeds to Step 995 to tentatively terminate the present routine. It should be noted that the CPU 11 sets the flag ABF to "0" when the CPU 11 completes the final pre-collision brake control.

In contrast, when the first performance condition for the final pre-collision brake control is not satisfied, the CPU 11 makes a "No" determination at Step 945, and proceeds to Step 960 to determine whether or not the second performance condition for the final pre-collision brake control is satisfied. The second performance condition for the final pre-collision brake control is satisfied when all of the following two conditions are satisfied.

The predicted collision time period TTC is equal to or shorter than the time threshold T3th.

The accelerator operation amount AP is smaller than the control threshold APcth.

When the second performance condition for the final pre-collision brake control is satisfied, the CPU 11 makes a "Yes" determination at Step 960, and executes the processes of Step 950 and Step 955 to proceed to Step 995. In contrast, when the second performance condition for the final pre-collision brake control is not satisfied, the CPU 11 makes a "No" determination at Step 960, and proceeds to Step 995 directly to tentatively terminate the present routine.

As described above, the second device can set the independent allowance conditions (the condition for setting the flag PFA to "1", the condition for setting the flag PFB to "1", and the condition for setting the flag PFC to "1") for the pre-collision controls (the alert control, the advanced pre-collision brake control, and the final pre-collision brake control) which are performed when the accelerator operation amount AP is equal to or greater than the control threshold APcth. Thus, the second device can achieve the following effects.

For example, the own vehicle SV tends to complete overtaking the preceding vehicle before the predicted collision time period TTC becomes equal to or shorter than the time threshold T3th. If the velocity threshold Vs1th for the alert control and the velocity threshold Vs2th for the advanced pre-collision brake control have been set to the same value as the velocity threshold Vs3th for the final pre-collision brake control, the allowance conditions for the alert control, the advanced pre-collision brake control, and the final pre-collision brake control become satisfied simultaneously (at the same timing). Therefore, when the own vehicle SV overtakes the preceding vehicle, a "situation where both of the alert control and the advanced pre-collision brake control are performed, but the final pre-collision brake control is not performed" occurs. Such a situation annoys the driver.

In contrast, the second device can set both the velocity threshold Vs1th for the alert control and the velocity threshold Vs2th for the advanced pre-collision brake control to values smaller than the velocity threshold Vs3th for the final pre-collision brake control (for example, refer to the destination C of the table shown in FIG. 7). In this case, both the allowance condition for the alert control and the allowance condition for the advanced pre-collision brake control is harder to be satisfied than the allowance condition for the final pre-collision brake control. Therefore, even if the predicted collision time period TTC becomes equal to or shorter than the time threshold T1th while the own vehicle SV is overtaking the preceding vehicle, the second device hardly performs the alert control, because the allowance condition for the alert control has not been satisfied in many cases. Furthermore, even if the predicted collision time period TTC becomes equal to or shorter than the time threshold T2th while the own vehicle SV is overtaking the preceding vehicle, the second hardly performs the advanced pre-collision brake control, because the allowance condition for the advanced pre-collision brake control has not been satisfied in many cases. That is, the second device can reduce/decrease a possibility that the unnecessary alert control and/or the unnecessary advance control are performed. In addition, the allowance condition for the final pre-collision brake control is satisfied more easily than the allowance condition for the alert control and the allowance condition for the advanced pre-collision brake control. Therefore, the second device can improve/increase the possibility that the final pre-collision brake control is performed when the driver performs the wrong operation.

More specifically, according to the velocity threshold table 70 shown in FIG. 7, the velocity thresholds Vs1th and Vs2th corresponding to the destination C are set at "10 km/h", and the velocity threshold Vs3th corresponding to the destination C is set at "15 km/h". It is assumed that the accelerator operation amount AP becomes equal to or greater than the operation amount threshold AP1th when the vehicle velocity Vs is "13 km/h" while the driver is performing the operation for making the own vehicle SV overtake the preceding vehicle. The vehicle velocity Vs is higher than any of the velocity thresholds Vs1th and Vs2th, and the vehicle velocity Vs is lower than the velocity threshold Vs3th. Therefore, the second device determines that neither the allowance condition for the alert control nor the allowance condition for the advanced pre-collision brake control is satisfied, and the allowance condition for the final pre-collision brake control is satisfied. Even when the predicted collision time period TTC becomes equal to or shorter than the time threshold T1th, the second device does not perform the alert control, since the allowance condition for the alert control has not been satisfied. In addition, even when the predicted collision time period TTC becomes equal to or shorter than the time threshold T2th, the second device does not perform the advanced pre-collision brake control, since the allowance condition for the advanced pre-collision brake control has not been satisfied. Moreover, the second device performs the final pre-collision brake control, if the own vehicle SV has not completed overtaking the preceding vehicle before the predicted collision time period TTC becomes equal to or shorter than the time threshold T3th.

In contrast, it is assumed that the accelerator operation amount AP becomes equal to or greater than the operation amount threshold AP1th when the vehicle velocity Vs is "13 km/h" while the driver is performing the wrong operation. In this case, as described above, the second device determines that only the allowance condition for the final pre-collision brake control is satisfied. Therefore, even when the predicted collision time period TTC becomes equal to or shorter than the time threshold T1th, the second device does not perform the alert control. Similarly, even when the predicted collision time period TTC becomes equal to or shorter than the time threshold T2th, the second device does not perform the advanced pre-collision brake control. However, the second device performs the final pre-collision brake control, when the predicted collision time period TTC becomes equal to or shorter than the time threshold T3th.

Meanwhile, the velocity threshold Vsth corresponding to the destination C has been set at "10 km/h" in the velocity threshold table 14 of the first device. Therefore, none of the allowance conditions is satisfied under any of the assumptions described above. Accordingly, the first device does not perform any pre-collision controls.

As understood from the above described example, according to the velocity threshold table 70, each of the threshold velocity Vs1th for the alert control and the threshold velocity Vs2th for the advanced pre-collision brake control can be set to a value smaller than the velocity threshold Vs3th for the final pre-collision brake control, corresponding to the specific destination. Therefore, in the case where the own vehicle SV travels in the specific destination, the second device can reduce/decrease the possibility that the unnecessary alert control and the unnecessary advanced pre-collision brake control are performed when the own vehicle SV is overtaking the preceding vehicle, and can prevent "the possibility that at least the final pre-collision brake control is performed certainly" from being reduced/decreased, when the driver is performing the wrong operation.

Once the final pre-collision brake control starts to be performed, the final pre-collision brake control continues being performed until the time point at which the predetermined time period elapses from the time point at which the velocity vehicle Vs becomes "0". In contrast, the alert control which is started when the accelerator operation amount AP is equal to or greater than the control threshold APcth is stopped/canceled when at least one of the above described conditions (1A) through (3A) is satisfied. Furthermore, the advanced pre-collision brake control which is started when the accelerator operation amount AP is equal to or greater than the control threshold APcth is stopped/canceled when at least one of the above described conditions (1 B) through (3B) is satisfied. It is considered that there is a region in which there are many drivers who feel more annoyed with the final pre-collision brake control if that final pre-collision brake control is wrongly/erroneously caused to start than (as compared with) "the alert control and the advanced pre-collision brake control" if "the alert control and the advanced pre-collision brake control" are wrongly/ erroneously caused to start. This is because, the final pre-collision brake control continues being performed until the vehicle velocity Vs becomes "0", whereas, "the alert control and the advanced pre-collision brake control" can be stopped/canceled when the accelerator operation amount AP becomes equal to or smaller than the second operation amount threshold AP2th.

According to the second device, the velocity threshold Vs3th for the final pre-collision brake control can be set to a value smaller than the vehicle threshold Vs1th for the alert control or to a value smaller than the vehicle threshold Vs2th for the advanced pre-collision brake control (refer to the destination A of the table in FIG. 7). Therefore, according to the second device, the allowance condition for the final pre-collision brake control is designed to be harder to be satisfied than the allowance condition for the alert control and the allowance condition for the advanced pre-collision brake control. As a result, the possibility that the final pre-collision brake control is performed can be reduced/decreased. Furthermore, the allowance condition for the alert control and the allowance condition for the advanced pre-collision brake control are satisfied more easily than the allowance condition for the final pre-collision brake control. Therefore, the second device can prevent the "possibility that the alert control and the advanced pre-collision brake control are performed when the wrong operation is performed" from being reduced/decreased.

For example, the velocity thresholds Vs1th and Vs2th have been set to "20 km/h", and the velocity threshold Vs3th has been set to "10 km/h" corresponding to the destination A according to the velocity threshold table 70 shown in FIG. 7. It is assumed that the accelerator operation amount AP becomes equal to or greater than the operation amount threshold AP1th when the vehicle velocity Vs is "13 km/h" while the driver is performing the operation for making the own vehicle SV overtake the preceding vehicle. The vehicle velocity Vs is equal to or lower than any of the velocity thresholds Vs1th and Vs2th, and the vehicle velocity Vs is higher than the velocity threshold Vs3th. Therefore, the second device determines that the allowance conditions for the alert control and the advanced pre-collision brake control are satisfied, and the allowance condition for the final pre-collision brake control is not satisfied. Accordingly, the second device performs the alert control when the predicted collision time period TTC becomes equal to or shorter than the time threshold T1th, because the allowance condition for the alert control has been satisfied. Furthermore, the second device performs the advanced pre-collision brake control when the predicted collision time period TTC becomes equal to or shorter than the time threshold T2th, because the allowance condition for the advanced pre-collision brake control has been satisfied. However, the allowance condition for the final pre-collision brake control has not been satisfied, and thus, the second device does not perform the final pre-collision brake control even when the predicted collision time period TTC becomes equal to or shorter than the time threshold T3th.

It should be noted that the vehicle threshold Vsth for the respective pre-collision controls which is designed not to be performed has been set at "0 km/h" in the velocity threshold table 70. More specifically, "the velocity threshold Vs1th for the alert control and the velocity threshold Vs2th for the advanced pre-collision brake control" corresponding to the destination D have been set at "0 km/h" in the velocity threshold table 70. For this reason, as with the velocity threshold table 14, the velocity threshold table 70 can be expressed as a table which stores information which indicates whether or not the respective pre-collision controls are allowed to be performed (or the respective pre-collision controls are prohibited) for each of the destinations.

As understood from the above, the second device can set the velocity threshold Vsth for each of the pre-collision controls. Therefore, the allowance condition for each of the pre-collision controls which is desired to be performed can be made to be satisfied easily, and the allowance condition for each of the pre-collision controls which is desired to be performed can be made to be harder to be satisfied.

Modification Example

The present disclosure is not limited to the above described embodiments, and can adopts various modifications. In some embodiments, at Step 525 in the routine shown in FIG. 5 or FIG. 8, the CPU 11 acquires the present location of the own vehicle SV from the GPS receiver 26, and regards/specifies a "region including/covering the acquired present location" as the destination (destination information). According to this embodiment, the CPU 11 can accurately acquire the velocity threshold corresponding to the region including the present location of the own vehicle SV.

In some embodiments, "prohibition information indicating that a certain pre-collision control is prohibited" is stored in the memory area where the "0 km/h" as the velocity threshold Vsth is stored in the velocity threshold table 14 or 70.

Processes according to this embodiment will be next described in detail.

The CPU 11 acquires "the information indicative of the velocity threshold Vsth or the prohibition information" corresponding to "the destination represented by the destination information 25" from the velocity threshold 14 at Step 530 in the routine shown in FIG. 5. When the information acquired by the CPU 11 at Step 530 is not the prohibition information but the velocity threshold Vsth, the CPU 11 proceeds to Step 535 to determine whether or not the vehicle velocity Vs is equal to or lower than the vehicle velocity Vsth. When the vehicle velocity Vs is equal to or the velocity threshold Vsth, The CPU 11 proceeds to Step 540 to set the allowance flag to "1". On the other hand, when the vehicle velocity Vs is higher than the velocity threshold Vsth, the CPU 11 makes a "No" determination at Step 535, and proceeds to Step 595 to tentatively terminate the present routine. In contrast, when the information acquired by the CPU 11 at Step 530 is not the velocity threshold Vsth but the prohibition information, the CPU 11 does not proceed to Step 535 from Step 530. Instead, the CPU 11 determines that the allowance condition is not satisfied to proceed to Step 550 from Step 530 so as to set the allowance flag to "0". Thereafter, the CPU 11 proceeds to Step 595 to tentatively terminate the present routine.

As understood from the above, it is determined that the allowance condition is not satisfied in the destination which is represented by the destination information 25 and corresponds to the prohibition information stored in the velocity threshold table 14 instead of the velocity threshold Vsth. In that destination, the CPU 11 makes a "No" determination at Step 622 in the routine shown in FIG. 6. As a result, any of the pre-collision controls are not performed.

In the above embodiments, the accelerator operation amount AP is detected by the accelerator opening sensor 21. In some embodiments, the accelerator operation amount AP is detected by a throttle opening sensor (not shown). The throttle opening sensor detects opening of the throttle valve of the internal combustion engine. As the accelerator operation amount AP becomes greater, the throttle valve opening becomes greater.

In some embodiments, at Step 520 shown in FIG. 5, the CPU 11 determines whether or not the accelerator operation amount AP is equal to or greater than the first operation amount AP1th and an operation speed indicative of a speed of the operation performed on the accelerator pedal is equal to or higher than an operation speed threshold. In this embodiment, when the accelerator operation amount AP is equal to or greater than the first operation amount AP1th and the operation speed is equal to or higher than the operation speed threshold, the CPU 11 makes a "Yes" determination at Step 520 to proceed to Step 525. On the other hand, when at least one of "a condition that the accelerator operation amount AP is smaller than the first operation amount AP1th" and "a condition that the operation speed is lower than the operation speed threshold" is satisfied, the CPU 11 makes a "No" determination at Step 520 to proceed to Step 595 so as to tentatively terminate the present routine.

In some embodiments, at Step 545 shown in FIG. 5, the CPU 11 determines whether or not a current TTC is longer than a previous TTC. The current TTC is the shortest/minimum predicted collision time period TTC among the predicted collision time periods TTC which were calculated at Step 618 in the routine shown in FIG. 6 when the routine was executed at a time point (a latest time point) which is the latest to the current time point. The previous TTC is the minimum predicted collision time period TTC among the predicted collision time periods TTC which were calculated at Step 618 in the routine when the routine was executed at a time point one time before the latest time point (a time point which is the predetermined time period before the latest time point). In this embodiment, when the current TTC is longer than the previous TTC, the CPU 11 makes a "Yes" determination at Step 545, and proceeds to Step 550 to set the allowance flag PF to "0". On the other hand, when the current TTC is equal to or shorter than the previous TTC, the CPU 11 makes a "No" determination at Step 545, and proceeds to Step 595 to tentatively terminate the routine shown in FIG. 5. This is because, when the drivers performs the steering operation so as to prevent the own vehicle SV from colliding with the obstacle, the current TTC of the obstacle becomes longer than the previous TTC of the obstacle, and thus, the CPU 11 can determine that the allowance cancel condition is satisfied so as to set the allowance flag PF to "0". Furthermore, in this embodiment, the CPU 11 may set the allowance flag to "0" when the current TTC is equal to or longer than the present TTC, only in a case where the accelerator operation amount AP is equal to or greater than the second operation amount threshold AP2th (only in the case where the CPU 11 makes a "No" determination at Step 545 shown in FIG. 5).

In some embodiments, when the current TTC is longer than the previous TTC, and a magnitude of a subtraction value (a difference) between the current TTC and the previous TTC is equal to or larger than a predetermined value, the CPU 11 makes a "Yes" determination at Step 545 to set the allowance flag to "0".

In some embodiments, the CPU 11 uses the target deceleration TG as the collision index value correlating with the collision probability instead of the predicted collision time period TTC. In this case, the CPU 11 calculates, as the target deceleration TG, a deceleration at which the own vehicle SV can stop before the own vehicle SV reaches each of the obstacles, based on the relative velocity of each of the obstacles and the distance between each of the obstacles and the own vehicle SV. When a direction in which the own vehicle SV accelerates is defined as a positive value, the target deceleration TG is a negative value. Therefore, as the target deceleration TG which is the negative value is smaller, the collision probability is higher. Thus, as the collision probability is higher, the collision index value is smaller, regardless of whether the predicted collision time period TTC or the target deceleration TG is used as the collision index value.

The collision index value may be a value which enables the driving support device to determine the collision probability. In some embodiments, the relative velocity of the obstacle in relation to the own vehicle SV, the relative distance of the obstacle in relation to the own vehicle, a relative lateral velocity of the obstacle in relation to the own vehicle SV, or the like is used as the collision index value.

In some embodiments, the control threshold APcth is a valued different from a value set as the first operation amount threshold AP1th. In some embodiments, the control threshold APcth has been set to a value equal to or greater than the second operation amount threshold AP2th.

In some embodiments, the CPU 11 executes "the process for the alert control at Step 628" immediately after the CPU 11 makes a "Yes" determination at Step 624, and then, proceeds to Step 626. According to this embodiment, the alert control continues being performed while the advanced pre-collision brake control or the final pre-collision brake control is being performed.

In some embodiments, the pre-collision controls are performed only when the vehicle velocity Vs is within a predetermined range.

Although the accelerator pedal is described as an example of the accelerator on which the driver performs the operation in order to accelerate the own vehicle SV, the accelerator is not limited to this example (the accelerator pedal). For example, an accelerator lever is used as the accelerator.

In some embodiments, the CPU 11 calculates the turning radius of the own vehicle SV based on the vehicle velocity Vs of the own vehicle SV and "a steering angel 6 of a steering wheel which are detected by a steering angle sensor (not shown)", to calculate the predicted traveling path RCR at Step 610 in the routine shown in FIG. 6.

In some embodiments, the CPU 11 calculates/updates the target deceleration TG for the advanced pre-collision brake control based on "the distance between the obstacle and the own vehicle SV" and "the relative velocity of the obstacle in relation to the own vehicle SV" at a time point at which the CPU 11 executes the process of Step 632 shown in FIG. 6, every time the CPU executes the process of Step 632 while the predicted collision time period TTC is equal to or shorter than the time threshold T2th. In this case, the target deceleration TG2 for the final pre-collision brake control is set to the target deceleration TG for the advanced pre-collision brake control which is lastly calculated in the advanced pre-collision brake control before the final pre-collision brake control is started, and the target deceleration TG1 for the final pre-collision brake control is set to the target deceleration TG for the advanced pre-collision brake control which was initially calculated in the advanced pre-collision brake control.

In some embodiments, "either a monocular camera or a stereo camera" which is able to detect the distance between the own vehicle SV and the object and the direction of the obstacle in relation to the own vehicle SV is used instead of the millimeter wave radar 20. In this case, the relative velocity of the object is calculates based on the past object locations.

In some embodiments, the driving support device fuses an object detection result acquired by the millimeter wave radar 20 with an object detection result acquired by either the monocular camera or the stereo camera, so as to detect the object location and the object relative velocity.

The millimeter wave radar 20 may be a sensor which transmits/emits a wireless medium and receives the reflected wireless medium to thereby detect the object. Therefore, in some embodiments, an infrared radar or a sonar radar is used instead of the millimeter wave radar 20.

The display unit 30 is not limited to the HUD. The display unit 30 may be a Multi Information Display (MID), a touch panel of the navigation device, or the like. The MID is a display panel which is arranged on a dash board and which includes a speed meter, a taco meter, a fuel gauge, an water temperature gauge, an od/trip meter, an warning lump, or the like.

What is claimed is:

1. A driving support device comprising:
   an object detecting unit for detecting an object which is present around an own vehicle;
   an accelerator operation amount detecting unit for acquiring an operation amount of an accelerator on which a driver performs an operation for accelerating the own vehicle;
   a velocity detecting unit for detecting a vehicle velocity which is a velocity of the own vehicle; and
   a pre-collision control performing unit for performing a pre-collision control to prevent a collision between the own vehicle and the object when a control start condition is satisfied, the control start condition being a condition satisfied when a collision index value correlating with a probability of the collision between the own vehicle and the object and an index value threshold satisfy a predetermined relationship;
   the pre-collision control performing unit configured to:
   acquire a velocity threshold corresponding to a region in which the own vehicle travels, based on information to specify the region; and
   start to perform the pre-collision control if an allowance condition has been satisfied before a timing at which the control start condition becomes satisfied, the allowance condition being a condition that the accelerator operation amount is equal to or greater than an operation amount threshold and the vehicle velocity is equal to or lower than the acquired velocity threshold; and
   the pre-collision control performing unit configured not to:
   perform the pre-collision control if the allowance condition has not been satisfied before the timing at which the control start condition becomes satisfied.

2. The driving support device according to claim 1 further comprising a relationship memory unit in which velocity threshold information defining a relationship between each of a plurality of regions and the corresponding one velocity threshold has been stored in advance,
   wherein the pre-collision control performing unit is configured to acquire the velocity threshold corresponding to the region in which the own vehicle travels, based on the velocity threshold information.

3. The driving support device according to claim 2, wherein,
   the velocity threshold information, which has been stored in the relationship memory unit in advance, defines a relationship between each of the plurality of regions and the corresponding one first velocity threshold serving as the velocity threshold and a relationship between each of a plurality of regions and the corresponding one second velocity threshold serving as the velocity threshold, the pre-collision control performing unit is configured to:

acquire the first velocity threshold and the second velocity threshold, each corresponding to the region in which the own vehicle travels, based on the velocity threshold information; and start to perform a first pre-collision control serving as the pre-collision control at a first timing at which a first control start condition serving as the control start condition becomes satisfied if a first allowance condition serving as the allowance condition has been satisfied before the first timing, the first control start condition being a condition that the collision index value and a first index value threshold serving as the index value threshold satisfy a first predetermined relationship serving as the predetermined relationship, and the first allowance condition being a condition that the accelerator operation amount is equal to or greater than the operation amount threshold and the vehicle velocity is equal to or lower than the acquired first velocity threshold, the pre-collision control performing unit is configured not to:

perform the first pre-collision control if the first allowance condition has not been satisfied before the first timing, the pre-collision control performing unit is configured to:

start to perform a second pre-collision control serving as the pre-collision control at a second timing at which a second control start condition serving as the control start condition becomes satisfied if a second allowance condition serving as the allowance condition has been satisfied before the second timing, the second control start condition being a condition that the collision index value and a second index value threshold serving as the index value threshold satisfy a second predetermined relationship serving as the predetermined relationship, and the second allowance condition being a condition that the accelerator operation amount is equal to or greater than the operation amount threshold and the vehicle velocity is equal to or lower than the acquired second velocity threshold, and the pre-collision control performing unit is configured not to:

perform the second pre-collision control if the second allowance condition has not been satisfied before the second timing.

4. The driving support device according to claim 2 further comprising a destination information memory unit in which information for identifying a destination which is a region in which the own vehicle is to be sold has been stored, wherein, information which defines a relationship between each of the plurality of the destinations and the corresponding one velocity threshold has been stored as the velocity threshold information in the relationship memory unit in advance, and the pre-collision control performing unit is configured to apply the destination which has been stored in the destination memory unit to the relationship memory unit so as to acquire the velocity threshold.

5. The driving support device according to claim 2 further comprising a location acquiring unit for acquiring a present location of the own vehicle, wherein the pre-collision control performing unit is configured to:

acquire the present location of the own vehicle from the location acquiring unit; and apply the acquired present location to the relationship memory unit so as to acquire the velocity threshold.

6. A driving support device comprising:

an object detecting unit for detecting an object which is present around an own vehicle;

an accelerator operation amount detecting unit for acquiring an operation amount of an accelerator on which a driver performs an operation for accelerating the own vehicle;

a velocity detecting unit for detecting a vehicle velocity which is a velocity of the own vehicle;

a pre-collision control performing unit for performing a pre-collision control to prevent a collision between the own vehicle and the object when a control start condition is satisfied, the control start condition being a condition satisfied when a collision index value correlating with a probability of the collision between the own vehicle and the object and an index value threshold satisfy a predetermined relationship; and a performing propriety information memory unit in which performing propriety information indicative of whether or not the pre-collision control is allowed to be performed in each of a plurality of regions has been stored in advance;

the pre-collision control performing unit configured to:

acquire the performing propriety information corresponding to a region in which the own vehicle travels from the performing propriety information memory unit; and start to perform the pre-collision control if an allowance condition has been satisfied before a timing at which the control start condition becomes satisfied, in a case where the performing propriety information indicates that the pre-collision control is allowed to be performed, the allowance condition being a condition that the accelerator operation amount is equal to or greater than an operation amount threshold and the vehicle velocity is equal to or lower than a velocity threshold; and the pre-collision control performing unit configured not to:

perform the pre-collision control when the allowance condition has not been satisfied before the timing at which the control start condition becomes satisfied; and the pre-collision control performing unit configured not to:

perform the pre-collision control regardless of whether or not the allowance condition has been satisfied, in a case where the performing propriety information indicates that the pre-collision control is not allowed to be performed.

7. A driving support device comprising:

an object detecting unit for detecting an object which is present around an own vehicle;

an accelerator operation amount detecting unit for acquiring an operation amount of an accelerator on which a driver performs an operation for accelerating the own vehicle;

a velocity detecting unit for detecting a vehicle velocity which is a velocity of the own vehicle; and a pre-collision control performing unit for performing a pre-collision control to prevent a collision between the own vehicle and the object, when a control start condition is satisfied, the control start condition being a condition satisfied when a collision index value correlating with a probability of the collision between the own vehicle and the object and an index value threshold satisfy a predetermined relationship;

the pre-collision control performing unit configured to:

start to perform a first pre-collision control serving as the pre-collision control at a first timing at which a first control start condition serving as the control start condition becomes satisfied, if a first allowance condition has been satisfied before the first timing, the first control start condition being a condition that the collision index value and a first index value threshold serving as the index value threshold satisfy a first predetermined relationship serving as the predetermined relationship; and the first allowance condition being a condition that the accelerator operation amount is equal to or greater than an operation amount threshold and the vehicle velocity is equal to or lower than a first velocity threshold, the pre-collision control performing unit configured not to:

perform the first pre-collision control if the first allowance condition has not been satisfied before the first timing;

the pre-collision control performing unit configured to:

start to perform a second pre-collision control serving as the pre-collision control at a second timing at which a second control start condition serving as the control start condition becomes satisfied if a second allowance condition has been satisfied before the second timing, the second control start condition being a condition that the collision index value and a second index value threshold serving as the index value threshold satisfy a second predetermined relationship serving as the predetermined relationship; and the second allowance condition being a condition that the accelerator operation amount is equal to or greater than the operation amount threshold and the vehicle velocity is equal to or lower than a second velocity threshold, and the pre-collision control performing unit configured not to:

perform the second pre-collision control if the second allowance condition has not been satisfied before the second timing.

\* \* \* \* \*